(12) United States Patent
Kim et al.

(10) Patent No.: US 12,230,797 B2
(45) Date of Patent: Feb. 18, 2025

(54) HIGH ENERGY DENSITY OLIVINE-BASED CATHODE MATERIALS

(71) Applicant: Rivian IP Holdings, LLC, Irvine, CA (US)

(72) Inventors: Soo Kim, Fremont, CA (US); Sookyung Jeong, San Jose, CA (US); Sun Ung Kim, Camas, WA (US); Tae Kyoung Kim, Albany, CA (US); Ki Tae Park, Santa Clara, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 17/824,259

(22) Filed: May 25, 2022

(65) Prior Publication Data

US 2023/0387408 A1 Nov. 30, 2023

(51) Int. Cl.
| | |
|---|---|
| *H01M 4/36* | (2006.01) |
| *C01B 25/45* | (2006.01) |
| *H01M 4/505* | (2010.01) |
| *H01M 4/525* | (2010.01) |
| *H01M 4/58* | (2010.01) |
| *H01M 4/02* | (2006.01) |

(52) U.S. Cl.
CPC ........... *H01M 4/5825* (2013.01); *C01B 25/45* (2013.01); *H01M 4/364* (2013.01); *H01M 4/505* (2013.01); *H01M 4/525* (2013.01); *C01P 2002/50* (2013.01); *C01P 2002/77* (2013.01); *C01P 2006/40* (2013.01); *H01M 2004/028* (2013.01)

(58) Field of Classification Search
None
See application file for complete search history.

(56) References Cited

U.S. PATENT DOCUMENTS

| | | | |
|---|---|---|---|
| 2004/0005265 A1* | 1/2004 | Chiang | H01M 4/382 429/231.95 |
| 2007/0141468 A1* | 6/2007 | Barker | H01M 4/364 429/231.1 |

FOREIGN PATENT DOCUMENTS

| | | | | |
|---|---|---|---|---|
| WO | WO-2009124894 A1 * | 10/2009 | | B82Y 30/00 |
| WO | WO-2014034775 A1 * | 3/2014 | | C01B 25/45 |

OTHER PUBLICATIONS

Qin et al. Synthesis and electrochemical performances of (1-x)LiMnPO4xLi3V2(PO4)3/C composite cathode materials for lithium ion batteries. Journal of Power Sources 239, 144-150 (Year: 2013).*

* cited by examiner

*Primary Examiner* — Tanisha Diggs
(74) *Attorney, Agent, or Firm* — Foley & Lardner LLP

(57) ABSTRACT

A cathode active material includes a lithium manganese (Mn) iron (Fe) phosphate, wherein a mol ratio of Mn:Fe is from about 3:7 to about 9:1, the lithium manganese iron phosphate is an olivine structure, and the Mn and Fe in the olivine are present in an partially ordered or partially disordered sublattice.

20 Claims, 17 Drawing Sheets

HIGH ENERGY DENSITY OLIVINE-BASED CATHODE MATERIALS

INTRODUCTION

The present technology is generally related to cathode active material includes a lithium manganese (Mn) iron (Fe) phosphate, wherein the lithium manganese iron phosphate is an olivine structure. The technology also relates to rechargeable batteries the cathode active material.

SUMMARY

In one aspect, the present disclosure provides a cathode active material comprising a lithium manganese (Mn) iron (Fe) phosphate, wherein a mol ratio of Mn:Fe is from about 3:7 to about 9:1, the lithium manganese iron phosphate is an olivine structure, and the Mn and Fe in the olivine are present in a partially ordered or partially disordered sublattice.

In another aspect, the present disclosure provides a cathode active material comprising a lithium metal phosphate other than $LiFePO_4$ and $LiMnPO_4$, and exhibiting a voltage that is greater than or equal to that of $LiFePO_4$ and less than or equal to that of $LiMnPO_4$, and an oxygen evolution that is less than or equal to $LiMnPO_4$.

In another aspect, the present disclosure provides an electrochemical cell comprising a cathode comprising a lithium manganese (Mn) iron (Fe) phosphate, wherein a mol ratio of Mn:Fe is from about 3:7 to about 9:1, the lithium manganese iron phosphate is an olivine structure, and the Mn and Fe in the olivine are present in a partially ordered or partially disordered sublattice.

In another aspect, the present disclosure provides an electrochemical cell comprising a cathode comprising a cathode active material comprising a lithium metal phosphate other than $LiFePO_4$ and $LiMnPO_4$, and exhibiting a voltage that is greater than or equal to that of $LiFePO_4$ and less than or equal to that of $LiMnPO_4$, and an oxygen evolution that is less than or equal to $LiMnPO_4$.

In another aspect, the present disclosure provides a lithium ion battery comprising a cathode active material comprising a lithium manganese (Mn) iron (Fe) phosphate, wherein a mol ratio of Mn:Fe is from about 3:7 to about 9:1, the lithium manganese iron phosphate is an olivine structure, and the Mn and Fe in the olivine are present in a partially ordered or partially disordered sublattice.

In another aspect, the present disclosure provides a battery pack comprising the cathode active material, the electrochemical cell, or the lithium ion battery of any of the above embodiments.

In yet another aspect, the present disclosure provides an electric vehicle comprising the lithium ion battery or the battery pack of any of the above embodiments.

DETAILED DESCRIPTION

Figure 1:
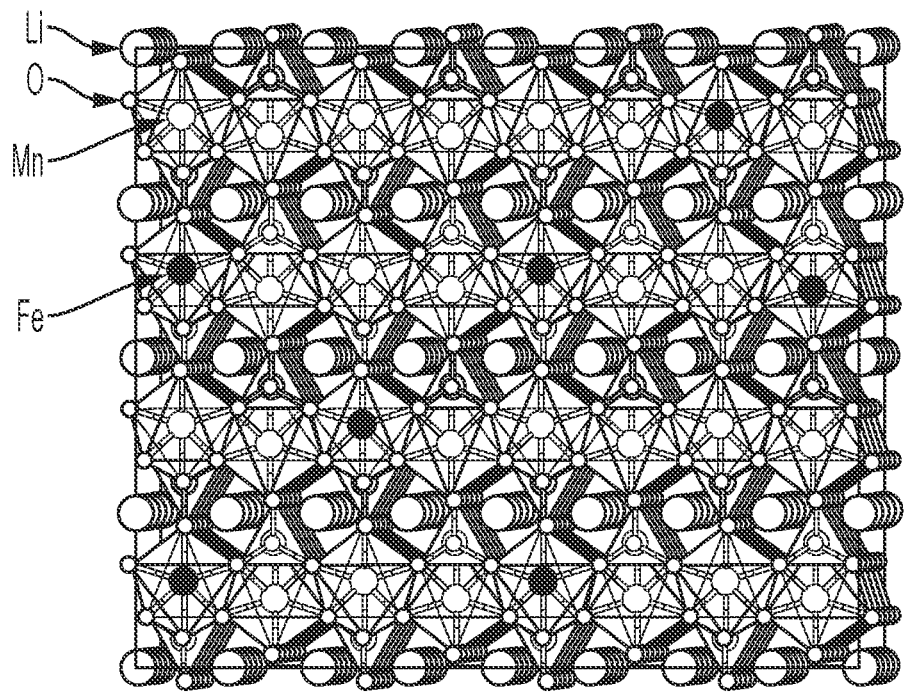
FIG. 1 is an illustration of a partially disordered $LiMnPO_4$ lattice, according to various embodiments.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

$LiMO_2$ (M=Ni, Mn, and/or Co; i.e. "LiNMC" materials) cathode active materials are routinely used in current electric vehicle production due their high energy densities (i.e., high voltage, high capacity). Because passenger electric vehicles and/or mobile electronic devices (i.e. phones, laptops, tablets, and the like) have a very limited space for the placement of rechargeable battery packs, using cathode materials with higher high energy density is of high consideration when designing such devices. As the Ni content increases in LiNMC cathodes, the battery thermal stability is also affected, leading to various safety issues and concerns.

$LiFePO_4$ (LFP) is a class of cathode materials, related to LiNMC, but is entirely based upon the oxidation and reduction of the iron. It also provides better safety profiles when compared to LiNMC materials. However, the energy density of LFP is significantly lower than LiNMC-based cathodes.

The average cell voltage of LFP is about 3.2 V vs. graphite, while the average voltage of $LiMO_2$ (lithium metal oxide) cathode materials varies from about 3.4 to 4.0 V vs. graphite, depending on the metal. In addition, the practical capacity of LFP materials is from about 150 mAh/g to about 165 mAh/g, compared to LiNMC material that exhibit capacities of about 170 mAh/g to about 210 mAh/g. As used herein, the energy density is defined as the product of voltage and capacity; therefore, the energy density of LFP is expected to be lower than LiNMC materials.

Manganese (Mn)-based olivine-type cathode structures, i.e., $LiMnPO_4$ (LMP), exhibit a redox voltage of about 4.0 V vs. graphite, which is much higher than that for LFP. However, LMP has a practical discharge capacity of about 145 mAh/g, which is slightly lower than LFP. The $Li^+$ diffusivity (i.e., ionic conductivity) of LMP is order of magnitudes lower than LFP, affecting the rate capabilities to be slower than LFP chemistry (i.e., fast charging/discharging). Increasing electronic conductivity (i.e., facilitating $e^-$ transport) has been shown to have a positive impact with regard to the ionic conductivity of a material one of main modifications to the materials includes increasing the wt % of carbon coatings on LMF surfaces.

Generally, the cathode active material $LiMPO_4$ (M=Fe, Mn, etc.) exhibits the olivine structure that includes $MO_6$ octahedra, with Li and O atoms in the structure. During charging and discharging, Li ions enter and exit the $LiMPO_4$ framework in the (010) direction: i.e., as a 1-dimentoinal $Li^+$ channel. LFP refers to where the $MO_6$ is $FeO_6$; LMP is where the $MO_6$ is $MnO_6$; and the LMFP of the present technology is where the $MO_6$ is mixture of $FeO_6$ and $MnO_6$. The olivine-type cathode materials have two distinct advantages over LiNMC cathode active materials: first, the raw material cost is lower; and second, the risk of thermal runaway is less (i.e. the stability toward thermal runaway is greater).

Described herein are materials that provide enhancements to the transitional voltage plateau in olivine-type $LiMn_xFe_{1-x}PO_4$ cathode materials by controlling the Fe/Mn metal (dis-)orderings and by blending with other lithium metal phosphate (i.e. abbreviated as Li—M—P—O or "$LiMPO_4$") cathode active materials exhibiting an operating voltage equal to or between that of $LiFePO_4$ and $LiMnPO_4$. The lithium metal phosphate candidate materials also have suppressed $O_2$ gas evolution when charged, that is superior to the oxygen evolution of $MnPO_4$, approaching or comparable to the oxygen evolution tendency of $FePO_4$.

Figure 2:
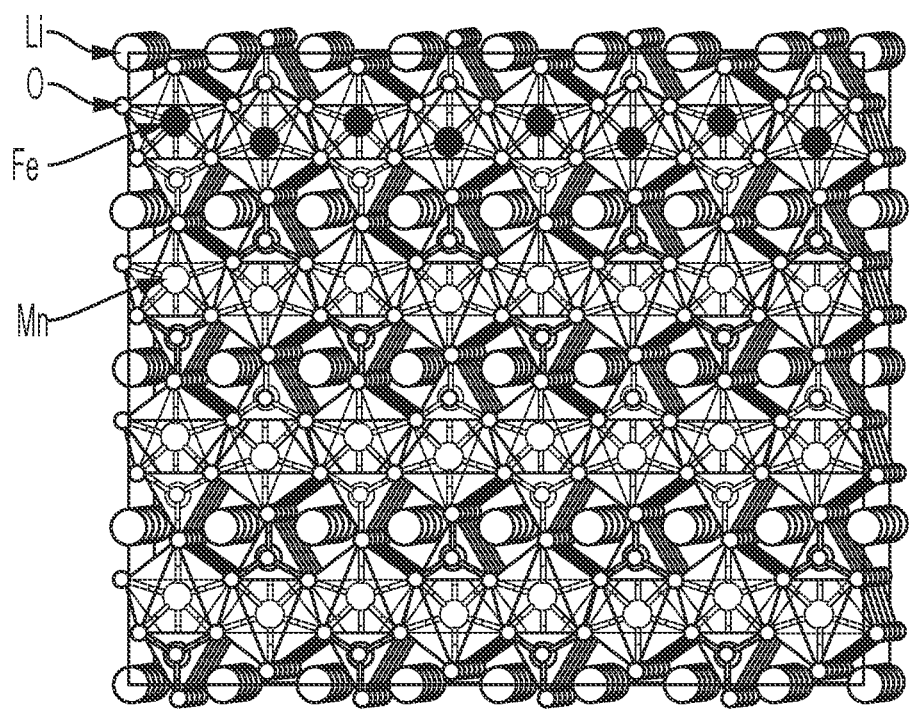
FIG. 2 is an illustration of a partially ordered $LiMPO_4$ lattice, according to various embodiments.

In one aspect, the present disclosure provides a cathode active material including a lithium (Li) manganese (Mn) iron (Fe) phosphate, also referred to as "LMFP," wherein a mol ratio of Mn:Fe is from about 3:7 to about 9:1, the lithium manganese iron phosphate is an olivine structure, and the Mn and Fe in the olivine are present in an ordered or disordered sublattice. The cathode active material may have the same general olivine-type structure as that of LFP and LMP. As used herein an ordered sublattice is one in which the unit cell, or subunit cell, of a structural motif repeats throughout the structure, while in a disordered sublattice, the structural motif not repeat with regularity and is random. Illustrative, non-limiting figures of a disordered $LMPO_4$ lattice (i.e., weak tendency for mixing with no local ordering) is shown in FIG. 1, and an ordered lattice (i.e., weak tendency for phase separating with short-/long-range ordering) in FIG. 2. The atomic positions are labelled for clarity. In some embodiments, the octahedral $FeO_6$ and $MnO_6$ groups are randomly distributed in portions of the lattice resulting in partial disordering of the lattice overall (i.e., weak tendency for mixing with no local ordering over some portion of the structure). In other embodiments, the octahedral $FeO_6$ and $MnO_6$ groups are repetitively distributed through portions of the lattic resulting in partial ordering of the lattice overall (i.e., weak tendency for phase separating with short-/long-range ordering).

The tendency of metal mixing (i.e., short-/long-range ordering) can also impact the morphology of cathode particle. When two metals strongly mix, they can form an ordered compound. In an extreme case, it can lead to slow lithium ion diffusion behavior and/or undesired phase change. If two metals do not mix well with one another, they may phase separate into a two-phase mixture. Therefore, for improved materials stability and electrochemical performance, it is desired that the metal mixing behavior should either be a partially disordered solid-solution (i.e., weak tendency for mixing) or a nano-composite (i.e., weakly phase-separating). These metal orderings can be impacted not only by their thermodynamic properties, but also variations in synthesis condition, temperature, pressure, agitation, precursor, dopant, additive, and/or the like, which can impact the reaction kinetics to induce a different mixing entropy behavior. For example, in the case of $LiNi_{0.5}Mn_{1.5}O_4$, Ni/Mn ordering transitions affect Li electrostatic interaction with transition metals, impacting the voltage curve shape. Differences in precursors, synthesis, and/or heat treatment conditions may result in low symmetry ordered (Fd-3m) or high symmetry (P4$_3$32) transition metal (e.g., Fe, Mn, and a dopant metal) ordering in LMFP within the Olivine-type structure. Such differences can impact the structural, thermal, and/or electrochemical properties.

Thus, it is desirable that the LMPO$_4$ lattice not be at the extremes (i.e. fully ordered at one extreme, and fully phase separated at the other). Rather, in one embodiment, the LMPO$_4$ lattice may be a mixture of partial ordering within the lattice at including short, medium and/or long range ordering. Or, in another embodiment, the LMPO$_4$ lattice may be a partially disordered solid solution, where the materials have a weak tendency for mixing. Or, in a further embodiment, the materials may be nanocomposite, or weakly phase separating at the atomic scale.

In any embodiment, the cathode active material may include a LMFP of formula LiMn$_x$Fe$_{1-x}$PO$_4$(0<x<1). In any embodiments, the mol ratio of Mn:Fe may be from about 30:70, about 35:65, about 40:60, about 45:55, about 50:50, about 55:45, about 60:40, about 65:35, about 70:30, about 75:25, about 80:20, about 85:15, about 90:10, about 95:5, or any value in the range between any two of the foregoing values. Without being bound to theory, increased Mn concentration is believed to influence the operating voltage of the cathode active material to higher values, while increased Fe concentration is believed to influence greater stability with respect to thermal runaway, rate performance, and processability (i.e. formation, where Fe-rich, LFP generally has larger primary particle size than Mn-rich, LMP) of the cathode active materials. With regard to the safety aspect, both LMP and LFP is known to safely operate at temperature of 250° C. and above, unlike LiNMC materials. In particular, LFP does not substantially decompose until 500° C. and above.

Various other cathode active materials may be mixed with the LMFP materials to improve the energy density. For example, other lithium metal phosphates or lithium metal oxides may be mixed with the LMFP materials to further contribute to thermal stability of LMFP cathodes (i.e., suppressing the O$_2$ evolution until higher temperature), in addition to increasing the energy density.

In any embodiment, the cathode active material may further comprise a lithium metal phosphate other than LiFePO$_4$ and LiMnPO$_4$, wherein the cathode active material exhibits a voltage greater than or equal to that of LiFePO$_4$ and less than or equal to that of LiMnPO$_4$, and an oxygen evolution less than or equal to that of LiFePO$_4$. In any embodiment, the lithium metal phosphate comprises V, Cr, Sb, or Cu. In any embodiment, the lithium metal phosphate is a composition of formula Li$_a$M$_b$P$_c$O$_d$, M is V, Cr, Sb, or Cu; 0<a≤2; 1≤b≤2; 1≤c≤3; and 4≤d≤12. In any embodiment, the lithium metal phosphate comprises LiV(PO$_4$)$_2$, Li$_{0-2}$CrP$_2$O$_7$, LiSb(PO$_4$)$_2$, Li$_{1.5-3}$V$_2$(PO$_4$)$_3$, LiCu(PO$_3$)$_3$, Li$_{0-1}$VPO$_5$, LiCu(PO$_4$)$_2$, LiV(PO$_4$)$_2$, Li$_{0-1}$VP$_2$O$_7$, LiCr$_2$(PO$_4$)$_3$, Li$_{1-2}$CoP$_2$O$_7$, Li$_{0-2}$CuPO$_4$, or a combination of any two or more thereof. Preferably, in some embodiment, the lithium metal phosphate comprises Li$_{0-2}$CrP$_2$O$_7$, Li$_{1.5-3}$V$_2$(PO$_4$)$_3$, LiCu(PO$_3$)$_3$, Li$_{0-1}$VPO$_5$, Li$_{0-1}$VP$_2$O$_7$, LiCr$_2$(PO$_4$)$_3$, Li$_{1-2}$CoP$_2$O$_7$, Li$_{0-2}$CuPO$_4$, or a combination of any two or more thereof. More preferably, in some embodiment, the lithium metal phosphate comprises Li$_{1.5-3}$V$_2$(PO$_4$)$_3$, Li$_{0-1}$VPO$_5$, Li$_{0-1}$VP$_2$O$_7$, or a combination of any two or more thereof. Illustrative compositions of these formulas include, but are not limited to, Li$_{0-2}$CrP$_2$O$_7$, means CrP$_2$O$_7$, LiCrP$_2$O$_7$, Li$_2$CrP$_2$O$_7$, as well as Li composition in between: e.g., Li$_{1.5}$CrP$_2$O$_7$.

In any of the above embodiments, the cathode active material may further comprise a lithium metal oxide of formula LiM'O$_2$, wherein M' is Ni, Co, Mn, Al, Fe, or Cu.

In another aspect, the present disclosure provides a cathode active material comprising a lithium metal phosphate other than LiFePO$_4$ and LiMnPO$_4$, and exhibiting a voltage that is greater than, or equal to, that of LiFePO$_4$ and less than or equal to that of LiMnPO$_4$, and an oxygen evolution that is less than or equal to LiMnPO$_4$.

In any embodiment, the lithium metal phosphate comprises V, Cr, Sb, or Cu. In any embodiment, the lithium metal phosphate is a composition of formula Li$_a$M$_b$P$_c$O$_d$, M is V, Cr, Sb, or Cu; 0<a≤2; 1≤b≤2; 1≤c≤3; and 4≤d≤12. In any embodiment, the lithium metal phosphate comprises LiV(PO$_4$)$_2$, Li$_{0-2}$CrP$_2$O$_7$, LiSb(PO$_4$)$_2$, Li$_{1.5-3}$V$_2$(PO$_4$)$_3$, LiCu(PO$_3$)$_3$, Li$_{0-1}$VPO$_5$, LiCu(PO$_4$)$_2$, LiV(PO$_4$)$_2$, Li$_{0-1}$VP$_2$O$_7$, LiCr$_2$(PO$_4$)$_3$, Li$_{1-2}$CoP$_2$O$_7$, Li$_{0-2}$CuPO$_4$, or a combination of any two or more thereof. In any embodiment, the lithium metal phosphate comprises Li$_{0-2}$CrP$_2$O$_7$, Li$_{1.5-3}$V$_2$(PO$_4$)$_3$, LiCu(PO$_3$)$_3$, Li$_{0-1}$VPO$_5$, Li$_{0-1}$VP$_2$O$_7$, LiCr$_2$(PO$_4$)$_3$, Li$_{1-2}$CoP$_2$O$_7$, Li$_{0-2}$CuPO$_4$, or a combination of any two or more thereof. In any embodiment, the lithium metal phosphate comprises Li$_{1.5-3}$V$_2$(PO$_4$)$_3$, Li$_{0-1}$VPO$_5$, Li$_{0-1}$VP$_2$O$_7$, or a combination of any two or more thereof. Illustrative compositions of these formulas include, but are not limited to, Li$_{0-2}$CrP$_2$O$_7$, means CrP$_2$O$_7$, LiCrP$_2$O$_7$, Li$_2$CrP$_2$O$_7$, as well as Li composition in between: e.g., Li$_{1.5}$CrP$_2$O$_7$.

In any embodiment, the lithium metal phosphate may be blended with LiFePO$_4$, LiMnPO$_4$, or a mixture thereof.

In any of the above embodiments, the cathode active material comprising olivine-type LMFP in a partially ordered or partially disordered sublattice or a lithium metal phosphate other than LiFePO$_4$ and LiMnPO$_4$ may include primary particles, secondary particle aggregates of the primary particles, or a combination therefore. In any embodiment, the size of the primary particle may vary from 5 nm to 3 μm. In any embodiment, the size of the primary particle may be from 5 nm to 20 nm, from 20 nm to 50 nm, from 50 nm to 100 nm, from 100 to 150 nm, from 150 nm to 200 nm, from 200 nm to 250 nm, from 250 nm to 300 nm, from 300 nm to 350 nm, from 350 nm to 400 nm, from 400 nm to 450 nm, from 450 nm to 500 nm, from 500 nm to 550 nm, from 550 nm to 600 nm, from 600 nm to 650 nm, from 650 nm to 700 nm, from 700 nm to 750 nm, from 750 nm to 800 nm, from 800 nm to 850 nm, from 850 nm to 900 nm, from 900 nm to 950 nm, from 950 nm to 1.0 μm, from 1.0 μm to 1.1 μm, from 1.1 μm to 1.2 μm, from 1.2 μm to 1.3 μm, from 1.3 μm to 1.4 μm, from 1.4 μm to 1.5 μm, from 1.5 μm to 1.6 μm, from 1.6 μm to 1.7 μm, from 1.7 μm to 1.8 μm, from 1.8 μm to 1.9 μm, from 1.9 μm to 2.0 μm, 2.0 from μm to 2.1 μm, from 2.1 μm to 2.2 μm, from 2.2 μm to 2.3 μm, from 2.3 μm to 2.4 μm, from 2.4 μm to 2.5 μm, from 2.5 μm to 2.6 μm, from 2.6 μm to 2.7 μm, from 2.7 μm to 2.8 μm, from 2.8 μm to 2.9 μm, or from 2.9 μm to 3.0 μm.

In any of the above embodiments, the cathode active material comprising olivine-type LMFP in a partially ordered or partially disordered sublattice or a lithium metal phosphate other than LiFePO$_4$ and LiMnPO$_4$ may include secondary particle aggregates. The secondary spherical particles may be spherical and uniform, and may have an average diameter from 200 nm to 50 μm. In any embodiment, the average particle size of the secondary spherical particles may be from 200 nm to 300 nm, from 300 nm to 400 nm, from 400 nm to 500 nm, from 500 nm to 600 nm, from 600 nm to 700 nm, from 700 nm to 800 nm, from 800 nm to 900 nm, from 900 nm to 1.0 μm, from 1.0 μm to 2.0 μm, from 2.0 μm to 3.0 μm, from 3.0 μm to 4.0 μm, from 4.0

μm to 5.0 μm, from 5.0 μm to 6.0 μm, from 6.0 μm to 7.0 μm, from 7.0 μm to 8.0 μm, from 8.0 μm to 9.0 μm, from 9.0 μm to 10.0 μm, from 10.0 μm to 15.0 μm, from 15.0 μm to 25.0 μm, and/or from 25.0 μm to 50.0 μm.

In any of the above embodiments, the cathode active material comprising an olivine-type LMFP in a partially ordered or partially disordered sublattice or a lithium metal phosphate other than $LiFePO_4$ and $LiMnPO_4$ may include primary particles or secondary particle aggregates of more than two particle sizes (e.g., having a bimodal distribution).

In any of the above embodiments, the cathode active materials comprising olivine-type LMFP in a partially ordered or partially disordered sublattice or a lithium metal phosphate other than $LiFePO_4$ and $LiMnPO_4$ may have a surface BET area of about 8 $m^2/g$, 10 $m^2/g$, about 12 $m^2/g$, about 14 $m^2/g$, about 16 $m^2/g$, about 18 $m^2/g$, about 20, about 22 $m^2/g$, about 24 $m^2/g$, about 26 $m^2/g$, about 28 $m^2/g$, about 30 $m^2/g$, about 35 $m^2/g$, or any value in the range between any two of the forgoing values.

In another aspect, the present disclosure provides methods of preparing any of the above cathode active material comprising olivine-type LMFP in a partially ordered or partially disordered sublattice or a lithium metal phosphate other than $LiFePO_4$ and $LiMnPO_4$.

In any embodiment, the cathode active material comprising LMFP may be mixed with another cathode active material comprising a lithium metal phosphate other than $LiFePO_4$ and $LiMnPO_4$, including but are not limited to Li—V—P—O cathode materials, e.g., $Li_3V_2(PO_4)_3$, $LiVPO_5$, and $LiVP_2O_7$ at room temperature using solid-state of solution-based approach with a mixing time varying from 5 min to 24 hours, e.g., about 5 minutes, about 30 minutes, about 1 hour, about 2 hours, about 3 hours, about 4 hours, about 5 hours, about 6 hours, about 7 hours, about 8 hours, about 9 hours, about 10 hours, about 11 hours, about 12 hours, about 13 hours, about 14 hours, about 15 hours, about 16 hours, about 17 hours, about 18 hours, about 19 hours, about 20 hours, about 21 hour, about 22 hours, about 23 hours, about 24 hours, or any time in a range of any two of the forgoing values. In the case of wet-milling method, either distilled $H_2O$, as well as organic solvent including but not limited to acetone, ethanol, isopropyl alcohol, may be used to induce powder mixing. In another embodiment, the pH of the aqueous solution may be controlled by the presence of acid or base. Then, the mixture may be optionally recovered and/or dried then annealed at elevated temperature, wherein the elevated temperature may be any of the following values or in a range of any two of the following values: 50° C., 75° C., 100° C., 125° C., 150° C., 200° C., 400° C., 500° C., 600° C., 700° C., 800° C., or 900° C. The aging time may be any of the following values or in a range of any two of the following values: 30 minutes, 40 minutes, 50 minutes, 1 hour, 2 hours, 3 hours, 4 hours, 8 hours, 12 hours, 16 hours, 20 hours, or 24 hours. Changing the reaction time, precursor, condition, and another element may affect the mixing tendency between Fe and Mn in LMFP. Reducing/oxidizing conditions may be controlled by presence of different gas agents including but not limited to $N_2$, $O_2$, Air, Ar, $H_2$, CO, $CO_2$, or any mixture of two or more thereof.

In another aspect, the present disclosure provides an electrochemical cell comprising a cathode comprising a lithium (Li) manganese (Mn) iron (Fe) phosphate, wherein a mol ratio of Mn:Fe is from about 3:7 to about 9:1, the lithium manganese iron phosphate is an olivine structure, and the Mn and Fe in the olivine are present in a partially ordered or partially disordered sublattice. In any embodiments, the mol ratio of Mn:Fe may be from about 30:70, about 35:65, about 40:60, about 45:55, about 50:50, about 55:45, about 60:40, about 65:35, about 70:30, about 75:25, about 80:20, about 85:15, about 90:10, about 95:5, or any value between any two of the foregoing values.

The cathodes may include a cathode active material and one or more of a current collector, a conductive carbon, a binder, and other additives. The electrodes may also contain other materials such as conductive carbon materials, current collectors, binders, and other additives. Illustrative conductive carbon species include graphite, carbon black, Super P carbon black material, Ketjen Black, Acetylene Black, SWCNT, MWCNT, graphite, carbon nanofiber, and/or graphene, graphite. Illustrative binders may include, but are not limited to, polymeric materials such as polyvinylidenefluoride ("PVDF"), polyvinylpyrrolidone ("PVP"), styrene-butadiene or styrene-butadiene rubber ("SBR"), polytetrafluoroethylene ("PTFE") or carboxymethylcellulose ("CMC"). Other illustrative binder materials can include one or more of: agar-agar, alginate, amylose, Arabic gum, carrageenan, caseine, chitosan, cyclodextrines (carbonyl-beta), ethylene propylene diene monomer (EPDM) rubber, gelatine, gellan gum, guar gum, karaya gum, cellulose (natural), pectine, poly(3,4-ethylenedioxythiophene) polystyrene sulfonate (PEDOT-PSS), polyacrylic acid (PAA), poly(methyl acrylate) (PMA), poly(vinyl alcohol) (PVA), poly (vinyl acetate) (PVAc), polyacrylonitrile (PAN), polyisoprene (PIpr), polyaniline (PANi), polyethylene (PE), polyimide (PI), polystyrene (PS), polyurethane (PU), polyvinyl butyral (PVB), polyvinyl pyrrolidone (PVP), starch, styrene butadiene rubber (SBR), tara gum, tragacanth gum, fluorine acrylate (TRD202A), xanthan gum, or mixtures of any two or more thereof. The current collector may include a metal that is aluminum, copper, nickel, titanium, stainless steel, or carbonaceous materials. In some embodiments, the metal of the current collector is in the form of a metal foil. In some specific embodiments, the current collector is an aluminum (Al) or copper (Cu) foil. In some embodiments, the current collector is a metal alloy, made of Al, Cu, Ni, Fe, Ti, or combination thereof. In another embodiment, the metal foils maybe coated with carbon: e.g., carbon-coated Al foil and the like.

Methods for preparing a cathode including a carbon coating are also provided. In any such embodiments, the cathode materials comprising olivine-type LMFP in a partially ordered or partially disordered sublattice or a lithium metal phosphate other than $LiFePO_4$ and $LiMnPO_4$ may be mixed with a conductive agent (e.g., carbon or CNT) and a binder material in a suitable solvent (e.g., N-Methyl-2-pyrrolidone, or NMP) to form a slurry. The slurry may then be coated on to a carbon-coated, etched, or bare current collector (e.g., Al foil), then dried in the oven to remove the solvent.

Higher loading level ($mg/cm^2$) and tab/packing density ($g/cm^3$) of the cathode material may be achieved with more than two particle sizes (e.g., bimodal distribution) because the void space of larger particles can be filled with smaller particles. In some embodiments, the loading level for the cathode active material primary particles may be from about 5 $mg/cm^2$ to 30 $mg/cm^2$. This may include from 5 $mg/cm^2$ to 20 $mg/cm^2$, from 5 $mg/cm^2$ to 10 $mg/cm^2$, from 10 $mg/cm^2$ to 30 $mg/cm^2$, from 10 $mg/cm^2$ to 20 $mg/cm^2$, or from 12 $mg/cm^2$ to 15 $mg/cm^2$ (single sided). In some embodiments, the loading level for the cathode active material primary particles may be from 25 $mg/cm^2$ to 60 $mg/cm^2$ (double-sided). In any of the above embodiments, the pressed density of the cathode material may be from 1.7 g/cm$^3$ to 3 g/cm$^3$.

In any embodiment, the cathode may further comprise a lithium metal phosphate other than LiFePO$_4$ and LiMnPO$_4$, and that exhibits a voltage greater than or equal to that of LiFePO$_4$ and less than or equal to that of LiMnPO$_4$, and an oxygen evolution that is less than or equal to LiFePO$_4$.

In any embodiment, the lithium metal phosphate may comprise V, Cr, Sb, or Cu. In any embodiment, the lithium metal phosphate may be a composition of formula Li$_a$M$_b$P$_c$O$_d$, M is V, Cr, Sb, or Cu; 0<a≤2; 1≤b≤2; 1≤c≤3; and 4≤d≤12. In any embodiment, the lithium metal phosphate may comprise LiV(PO$_4$)$_2$, Li$_{0-2}$CrP$_2$O$_7$, LiSb(PO$_4$)$_2$, Li$_{1.5-3}$V$_2$(PO$_4$)$_3$, LiCu(PO$_3$)$_3$, Li$_{0-1}$VPO$_5$, LiCu(PO$_4$)$_2$, LiV(PO$_4$)$_2$, Li$_{0-1}$VP$_2$O$_7$, LiCr$_2$(PO$_4$)$_3$, Li$_{1-2}$CoP$_2$O$_7$, Li$_{0-2}$CuPO$_4$, or a combination of any two or more thereof. In any embodiment, the lithium metal phosphate may comprise Li$_{0-2}$CrP$_2$O$_7$, Li$_{1.5-3}$V$_2$(PO$_4$)$_3$, LiCu(PO$_3$)$_3$, Li$_{0-1}$VPO$_5$, Li$_{0-1}$VP$_2$O$_7$, LiCr$_2$(PO$_4$)$_3$, Li$_{1-2}$CoP$_2$O$_7$, Li$_{0-2}$CuPO$_4$, or a combination of any two or more thereof. In any embodiment, the lithium metal phosphate comprises Li$_{1.5-3}$V$_2$(PO$_4$)$_3$, Li$_{0-1}$VPO$_5$, Li$_{0-1}$VP$_2$O$_7$, or a combination of any two or more thereof.

In any of the above embodiments, the cathode active material may further comprise a lithium metal oxide of formula LiM'O$_2$, wherein M' is Ni, Co, Mn, Al, Fe, or Cu.

In any embodiment, the electrochemical cell further comprises an anode comprising lithium metal, a conductive carbon, activated carbon, graphite, graphene, silicon, silicon oxide, silicon carbide, pre-lithiated silicon oxide, pre-lithiated silicon, Li$_4$Ti$_5$O$_{12}$, or a mixture of any two or more thereof.

In any embodiment, the anode may include Li metal, graphite, Si, SiO$_x$, Si nanowire, lithiated Si, or any mixture of two or more thereof. In any embodiment, the anodes of the electrochemical cells may include lithium. In some embodiments, the anode may comprise a current collector (e.g., Cu foil) and an in situ-formed anode (e.g., Li metal) on a surface of the current collector facing the separator or solid-state electrolyte such that in an uncharged state. In such embodiments, the assembled cell does not comprise an anode active material.

The anodes may include a current collector, a conductive carbon, a binder, other additives, or a mixture of any two or more thereof. Illustrative conductive carbon species include graphite, carbon black, Super P carbon black material, Ketjen Black, Acetylene Black, SWCNT, MWCNT, graphite, carbon nanofiber, and/or graphene, graphite. Illustrative binders may include, but are not limited to, polymeric materials such as polyvinylidenefluoride ("PVDF"), polyvinylpyrrolidone ("PVP"), styrene-butadiene or styrene-butadiene rubber ("SBR"), polytetrafluoroethylene ("PTFE") or carboxymethylcellulose ("CMC"). Other illustrative binder materials can include one or more of: agar-agar, alginate, amylose, Arabic gum, carrageenan, caseine, chitosan, cyclodextrines (carbonyl-beta), ethylene propylene diene monomer (EPDM) rubber, gelatine, gellan gum, guar gum, karaya gum, cellulose (natural), pectine, poly(3,4-ethylenedioxythiophene) polystyrene sulfonate (PEDOT-PSS), polyacrilic acid (PAA), poly(methyl acrylate) (PMA), poly(vinyl alcohol) (PVA), poly(vinyl acetate) (PVAc), polyacrylonitrile (PAN), polyisoprene (PIpr), polyaniline (PANi), polyethylene (PE), polyimide (PI), polystyrene (PS), polyurethane (PU), polyvinyl butyral (PVB), polyvinyl pyrrolidone (PVP), starch, styrene butadiene rubber (SBR), tara gum, tragacanth gum, fluorine acrylate (TRD202A), xanthan gum, or mixtures of any two or more thereof. The current collector may include a metal that is aluminum, copper, nickel, titanium, stainless steel, or carbonaceous materials. In some embodiments, the metal of the current collector is in the form of a metal foil. In some specific embodiments, the current collector is an aluminum (Al) or copper (Cu) foil. In some embodiments, the current collector is a metal alloy, made of Al, Cu, Ni, Fe, Ti, or combination thereof. In another embodiment, the metal foils maybe coated with carbon: e.g., carbon-coated Al foil and the like.

In any embodiment, the electrochemical cells may also include a separator between the cathode and the anode.

In any embodiment, the electrochemical cell further comprises a liquid or solid electrolyte. Illustrative liquid electrolytes include but are not limited to those comprising LiPF$_6$ salt dissolved in carbonate solutions. In any embodiment, sacrificial Li salt may be added to accommodate the Li loss for the solid electrolyte interphase (SEI) formation on the anode side. Illustrative solid-state electrolytes include but are not limited to oxide, sulfide, or phosphates-based crystalline structure.

In any embodiment, the cell configuration may be prismatic, cylindrical, or pouch type. Each cell may further be configured together to design pack, module, or stack with desired power output.

In another aspect, the present disclosure provides an electrochemical cell comprising a cathode comprising a cathode active material comprising a lithium metal phosphate other than LiFePO$_4$ and LiMnPO$_4$, and exhibiting a voltage that is greater than or equal to that of LiFePO$_4$ and less than or equal to that of LiMnPO$_4$, and an oxygen evolution that is less than or equal to LiFePO$_4$.

In any embodiment, the lithium metal phosphate may comprise V, Cr, Sb, or Cu. In any embodiment, the lithium metal phosphate may be a composition of formula Li$_a$M$_b$P$_c$O$_d$, M is V, Cr, Sb, or Cu; 0<a≤2; 1≤b≤2; 1≤c≤3; and 4≤d≤12. In any embodiment, the lithium metal phosphate may comprise LiV(PO$_4$)$_2$, Li$_{0-2}$CrP$_2$O$_7$, LiSb(PO$_4$)$_2$, Li$_{1.5-3}$V$_2$(PO$_4$)$_3$, LiCu(PO$_3$)$_3$, Li$_{0-1}$VPO$_5$, LiCu(PO$_4$)$_2$, LiV(PO$_4$)$_2$, Li$_{0-1}$VP$_2$O$_7$, LiCr$_2$(PO$_4$)$_3$, Li$_{1-2}$CoP$_2$O$_7$, Li$_{0-2}$CuPO$_4$, or a combination of any two or more thereof. In any embodiment, the lithium metal phosphate may comprise Li$_{0-2}$CrP$_2$O$_7$, Li$_{1.5-3}$V$_2$(PO$_4$)$_3$, LiCu(PO$_3$)$_3$, Li$_{0-1}$VPO$_5$, Li$_{0-1}$VP$_2$O$_7$, LiCr$_2$(PO$_4$)$_3$, Li$_{1-2}$CoP$_2$O$_7$, Li$_{0-2}$CuPO$_4$, or a combination of any two or more thereof. In any embodiment, the lithium metal phosphate comprises Li$_{1.5-3}$V$_2$(PO$_4$)$_3$, Li$_{0-1}$VPO$_5$, Li$_{0-1}$VP$_2$O$_7$, or a combination of any two or more thereof.

In any embodiment, the lithium metal phosphate may be blended with LiFePO$_4$, LiMnPO$_4$, or a mixture thereof.

In another aspect, the present disclosure provides a lithium ion battery comprising a cathode active material comprising a lithium manganese (Mn) iron (Fe) phosphate, wherein a mol ratio of Mn:Fe is from about 3:7 to about 9:1, the lithium manganese iron phosphate is an olivine structure, and the Mn and Fe in the olivine are present in a partially ordered or partially disordered sublattice.

In another aspect, the present disclosure provides a battery pack comprising the cathode active material, the electrochemical cell, or the lithium ion battery of any one of the above embodiments. The battery pack may find a wide variety of applications including but are not limited to general energy storage or in vehicles. In another aspect, a plurality of battery cells as described above may be used to form a battery and/or a battery pack, that may find a wide variety of applications such as general storage, or in vehicles.

Figure 3:
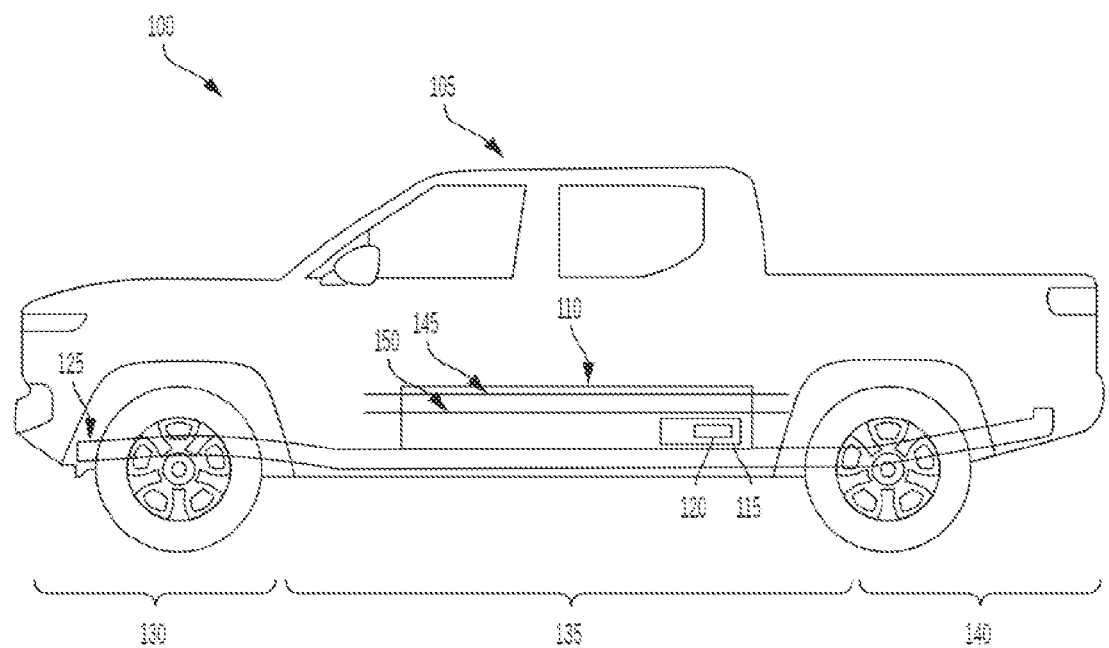
FIG. 3 is an illustration of a cross-sectional view of an electric vehicle, according to various embodiments.

By way of illustration of the use of such batteries or battery packs in an electric vehicle, FIG. 3 depicts an illustrative cross-sectional view 100 of an electric vehicle 105 installed with at least one battery pack 110. Electric vehicle 105 may include an electric truck, electric sport utility vehicle (SUV), electric delivery van, electric automobile, electric car, electric motorcycle, electric scooter, electric passenger vehicle, electric passenger truck, electric commercial truck, hybrid vehicle, or other vehicle such as a sea or air transport vehicle, airplane, helicopter, submarine, boat, or drone, among other possibilities. The battery pack 110 may also be used as an energy storage system to power a building, such as a residential home, or commercial building. Electric vehicles 105 may be fully electric or partially electric (e.g., plug-in hybrid), and they may be fully autonomous, partially autonomous, or unmanned. Electric vehicles 105 can also be human operated or non-autonomous.

Electric vehicles 105 such as electric trucks or automobiles can include on-board battery packs 110, battery modules 115, or battery cells 120 to power the electric vehicles. The electric vehicle 105 can include a chassis 125 (e.g., a frame, internal frame, or support structure). The chassis 125 can support various components of the electric vehicle 105. The chassis 125 can span a front portion 130 (e.g., a hood or bonnet portion), a body portion 135, and a rear portion 140 (e.g., a trunk, payload, or boot portion) of the electric vehicle 105. The battery pack 110 can be installed or placed within the electric vehicle 105. For example, the battery pack 110 can be installed on the chassis 125 of the electric vehicle 105 within one or more of the front portion 130, the body portion 135, or the rear portion 140. The battery pack 110 can include or connect with at least one busbar, e.g., a current collector element. For example, the first busbar 145 and the second busbar 150 can include electrically conductive material to connect or otherwise electrically couple the battery modules 115 or the battery cells 120 with other electrical components of the electric vehicle 105 to provide electrical power to various systems or components of the electric vehicle 105.

Figure 4:
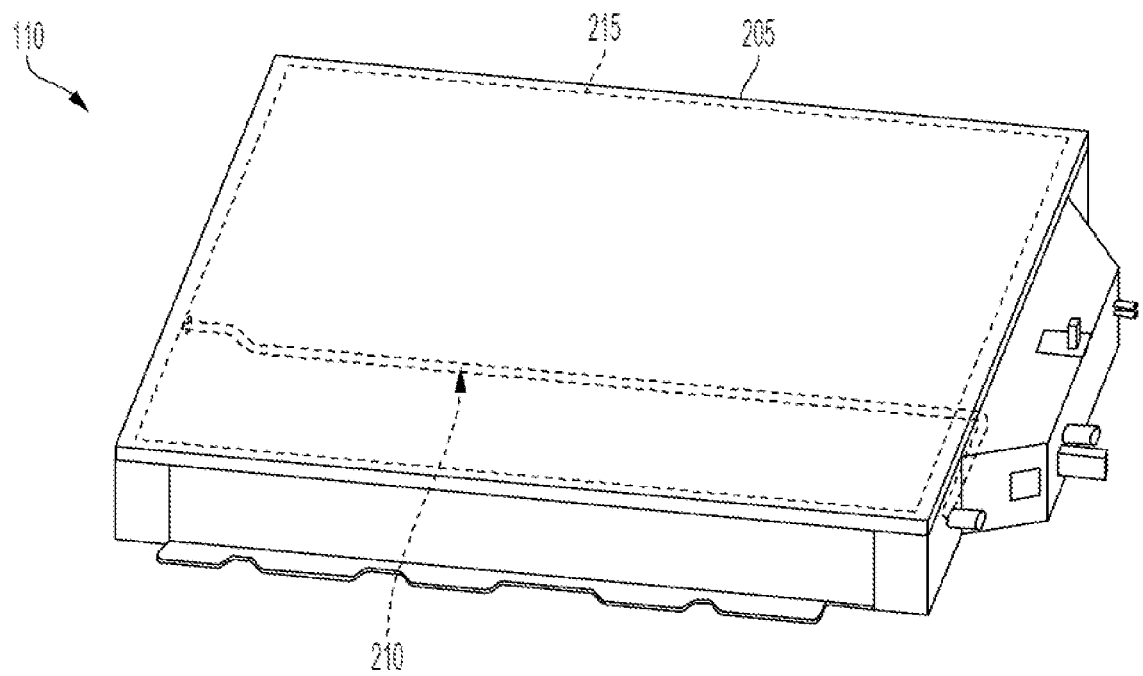
FIG. 4 is a depiction of an illustrative battery pack, according to various embodiments.

FIG. 4 depicts an illustrative battery pack 110. Referring to FIG. 4, among others, the battery pack 110 may provide power to electric vehicle 105. Battery packs 110 may include any arrangement or network of electrical, electronic, mechanical, or electromechanical devices to power a vehicle of any type, such as the electric vehicle 105. The battery pack 110 may include at least one housing 205. The housing 205 may include at least one battery module 115 or at least one battery cell 120, as well as other battery pack components. The housing 205 may include a shield on the bottom or underneath the battery module 115 to protect the battery module 115 from external conditions, for example if the electric vehicle 105 is driven over rough terrain (e.g., off-road, trenches, rocks, etc.) The battery pack 110 may include at least one cooling line 210 that can distribute fluid through the battery pack 110 as part of a thermal/temperature control or heat exchange system that may also include at least one cold plate 215. The cold plate 215 may be positioned in relation to a top submodule and a bottom submodule, such as in between the top and bottom submodules, among other possibilities. The battery pack 110 may include any number of cold plates 215. For example, there may be one or more cold plates 215 per battery pack 110, or per battery module 115. At least one cooling line 210 may be coupled with, part of, or independent from the cold plate 215.

The housing 230 of the battery cell 120 may include one or more materials with various electrical conductivity or thermal conductivity, or a combination thereof. The electrically conductive and thermally conductive material for the housing 230 of the battery cell 120 may include a metallic material, such as aluminum, an aluminum alloy with copper, silicon, tin, magnesium, manganese, or zinc (e.g., aluminum 1000, 4000, or 5000 series), iron, an iron-carbon alloy (e.g., steel), silver, nickel, copper, and a copper alloy, among others. The electrically insulative and thermally conductive material for the housing 230 of the battery cell 120 may include a ceramic material (e.g., silicon nitride, silicon carbide, titanium carbide, zirconium dioxide, beryllium oxide, and among others) and a thermoplastic material (e.g., polyethylene, polypropylene, polystyrene, polyvinyl chloride, or nylon), among others.

Figure 5:
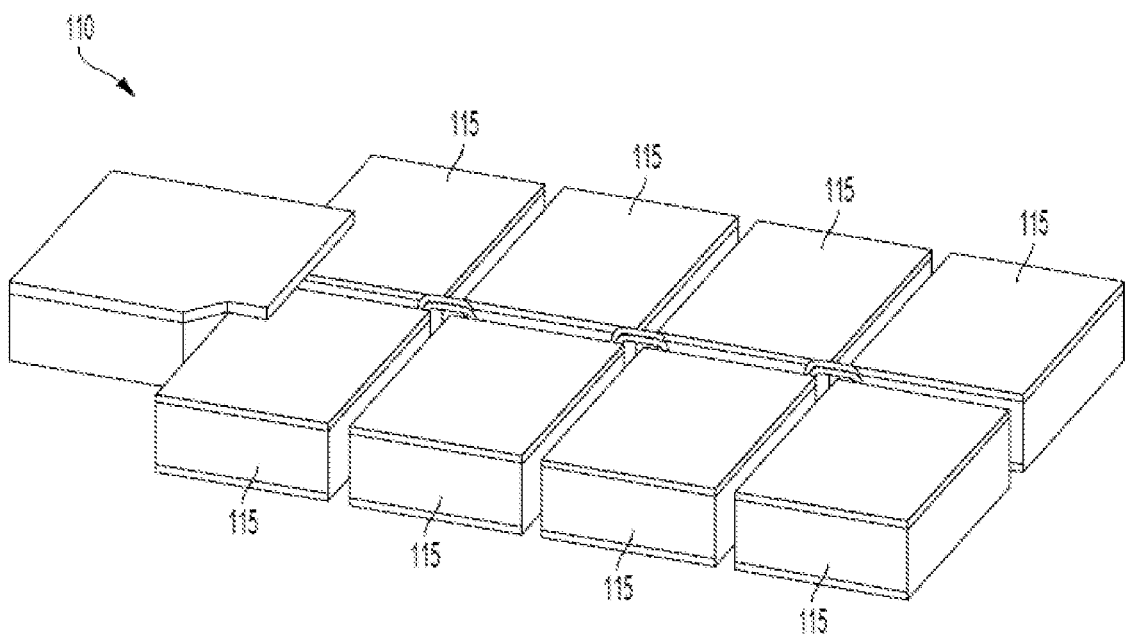
FIG. 5 is a depiction of an illustrative battery module, according to various embodiments.

FIG. 5 depicts illustrative battery modules 115. The battery modules 115 may include at least one submodule. For example, the battery modules 115 may include at least one first (e.g., top) submodule 220 or at least one second (e.g., bottom) submodule 225. At least one cold plate 215 may be disposed between the top submodule 220 and the bottom submodule 225. For example, one cold plate 215 may be configured for heat exchange with one battery module 115. The cold plate 215 may be disposed within, or thermally coupled between, the top submodule 220 and the bottom submodule 225. One cold plate 215 may also be thermally coupled with more than one battery module 115 (or more than two submodules 220, 225). The battery submodules 220, 225 may collectively form one battery module 115. In some embodiments, each submodule 220, 225 may be considered as a complete battery module 115, rather than a submodule.

The battery modules 115 may each include a plurality of battery cells 120. The battery modules 115 may be disposed within the housing 205 of the battery pack 110. The battery modules 115 may include battery cells 120 that are cylindrical cells, prismatic cells, or other form factor cells. The battery module 115 may operate as a modular unit of battery cells 120. As an illustration, a battery module 115 may collect current or electrical power from the battery cells 120 that are included in the battery module 115 and may provide the current or electrical power as output from the battery pack 110. The battery pack 110 may include any number of battery modules 115. For example, the battery pack may have one, two, three, four, five, six, seven, eight, nine, ten, eleven, twelve or other number of battery modules 115 disposed in the housing 205. It should also be noted that each battery module 115 may include a top submodule 220 and a bottom submodule 225, possibly with a cold plate 215 between the top submodule 220 and the bottom submodule 225. The battery pack 110 may include, or define, a plurality of areas for positioning of the battery module 115. The battery modules 115 may be square, rectangular, circular, triangular, symmetrical, or asymmetrical. In some embodiments, battery modules 115 may be different shapes, such that some battery modules 115 are rectangular but other battery modules 115 are square shaped, among other possibilities. The battery module 115 may include or define a plurality of slots, holders, or containers for a plurality of battery cells 120.

Figure 6A:
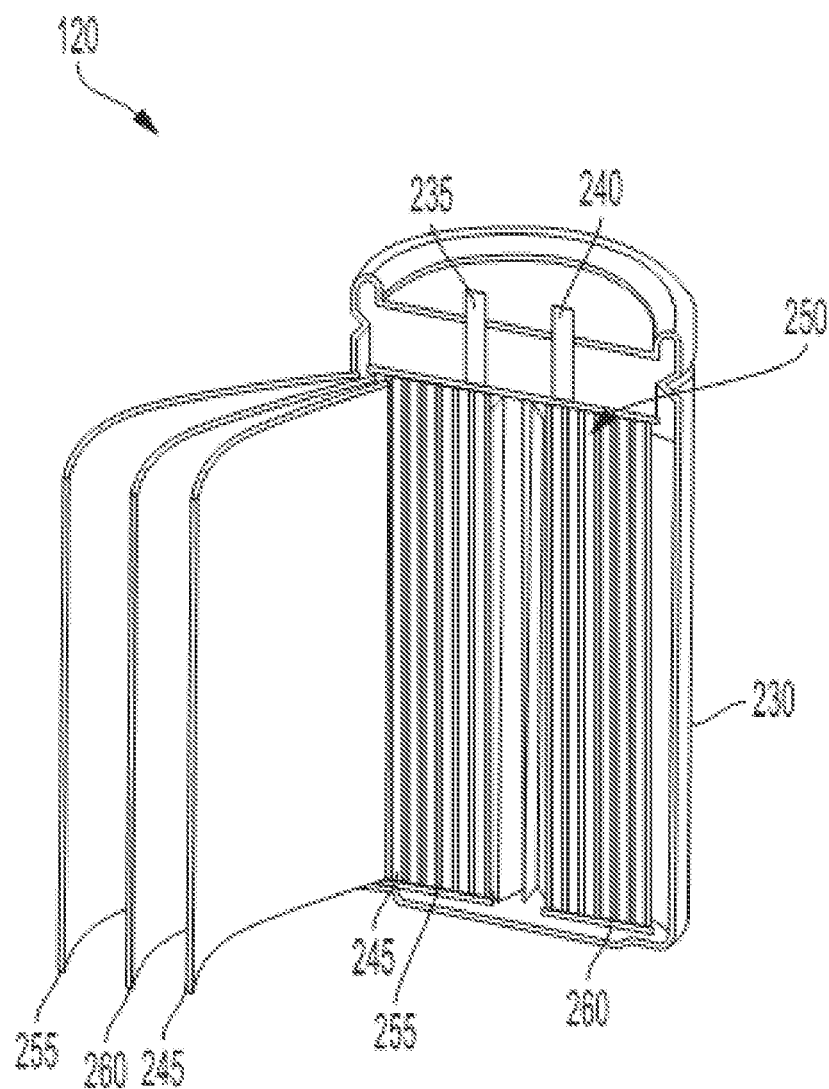
FIGS. 6A, 6B, and 6C are cross sectional illustrations of various batteries, according to various embodiments.
Figure 6B:
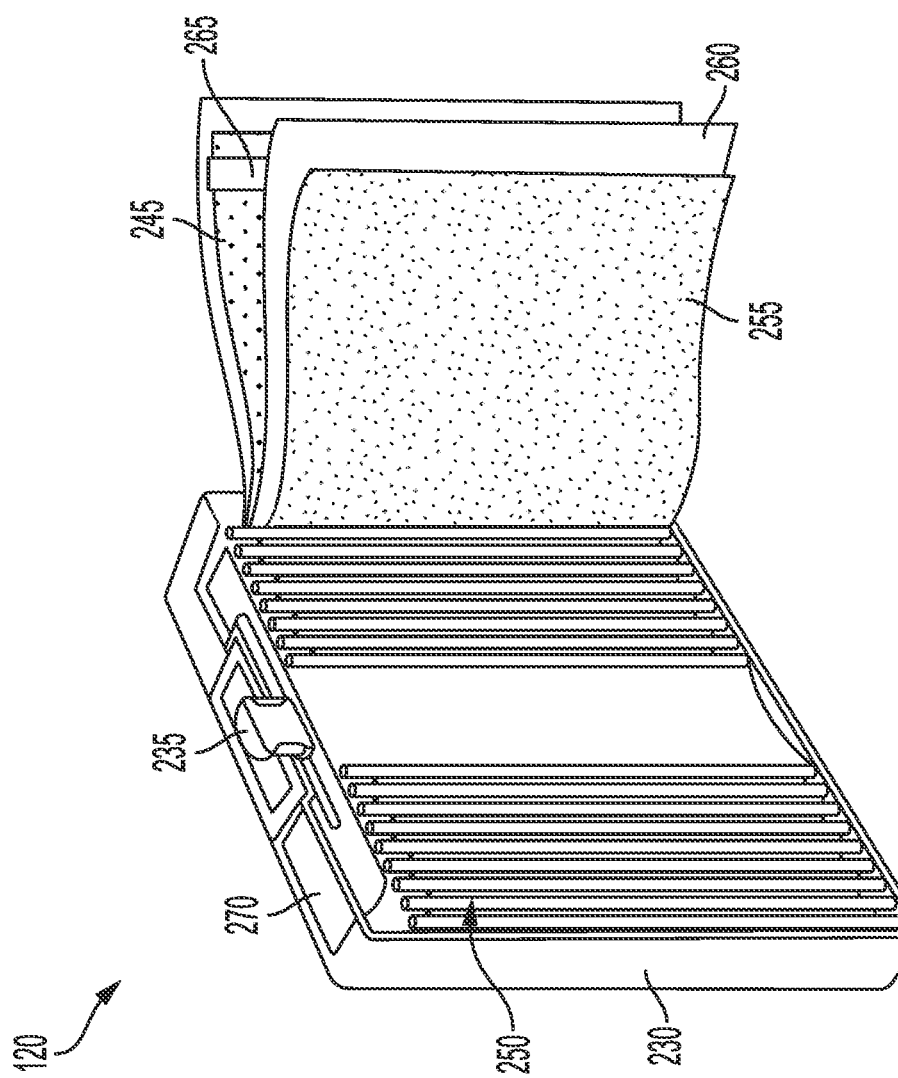
Figure 6C:
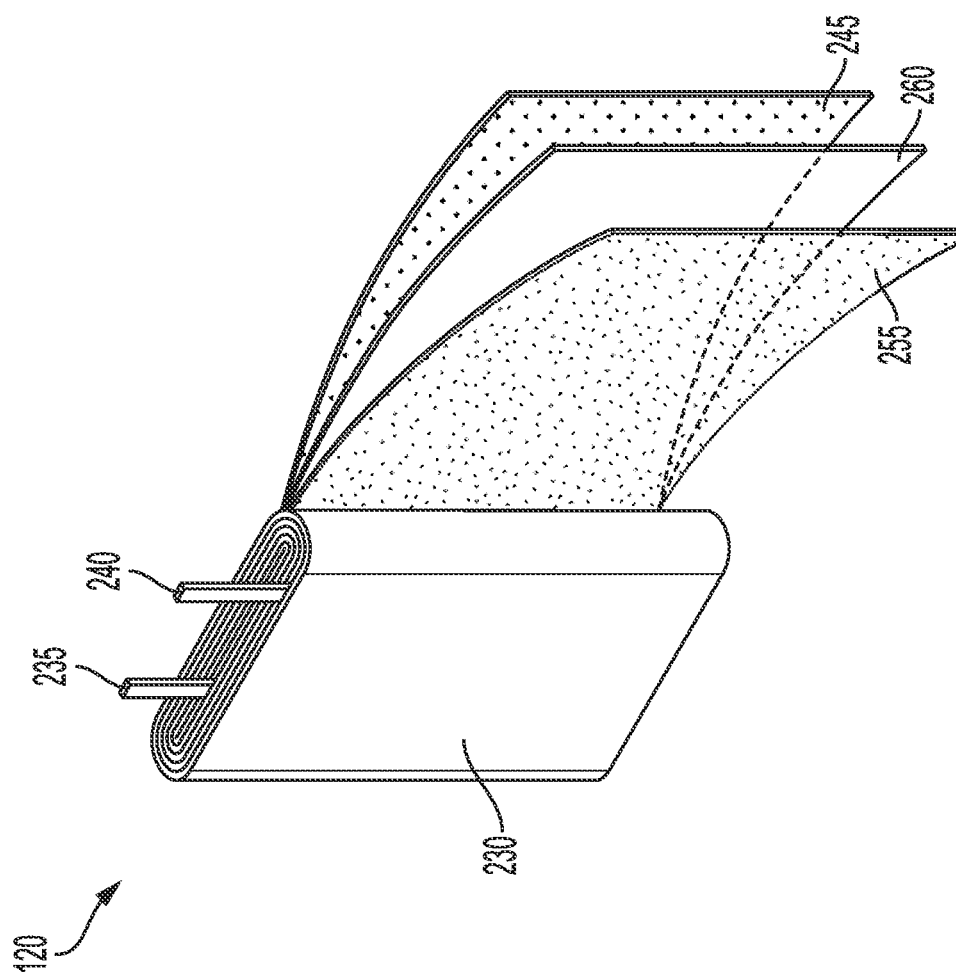

As noted above, battery cells 120 have a variety of form factors, shapes, or sizes. For example, battery cells 120 may have a cylindrical, rectangular, square, cubic, flat, or prismatic form factor. FIGS. 6A, 6B, and 6C depict illustrative cross sectional views of battery cells 120 in such various form factors. For example FIG. 6A is a cylindrical cell, 6B is a prismatic cell, and 6C is the cell for use in a pouch. The battery cells 120 may be assembled by inserting a wound or stacked electrode roll (e.g., a jellyroll) including electrolyte material into at least one battery cell housing 230. The electrolyte material, e.g., an ionically conductive fluid or other material, may generate or provide electric power for the battery cell 120. A first portion of the electrolyte material may have a first polarity, and a second portion of the electrolyte material may have a second polarity. The housing 230 may be of various shapes, including cylindrical or rectangular, for example. Electrical connections may be made between the electrolyte material and components of the battery cell 120. For example, electrical connections with at least some of the electrolyte material may be formed at two points or areas of the battery cell 120, for example to form a first polarity terminal 235 (e.g., a positive or anode terminal) and a second polarity terminal 240 (e.g., a negative or cathode terminal). The polarity terminals may be made from electrically conductive materials to carry electrical current from the battery cell 120 to an electrical load, such as a component or system of the electric vehicle 105.

The battery cell 120 may include at least one anode layer 245, which may be disposed within the cavity 250 defined by the housing 230. The anode layer 245 may receive electrical current into the battery cell 120 and output electrons during the operation of the battery cell 120 (e.g., charging or discharging of the battery cell 120). The anode layer 245 may include an active substance.

The battery cell 120 may include at least one cathode layer 255 (e.g., a composite cathode layer compound cathode layer, a compound cathode, a composite cathode, or a cathode). The cathode layer 255 may be disposed within the cavity 250. The cathode layer 255 may output electrical current out from the battery cell 120 and may receive electrons during the discharging of the battery cell 120. The cathode layer 255 may also release lithium ions during the discharging of the battery cell 120. Conversely, the cathode layer 255 may receive electrical current into the battery cell 120 and may output electrons during the charging of the battery cell 120. The cathode layer 255 may receive lithium ions during the charging of the battery cell 120.

The battery cell 120 may include an electrolyte layer 260 disposed within the cavity 250. The electrolyte layer 260 may be arranged between the anode layer 245 and the cathode layer 255 to separate the anode layer 245 and the cathode layer 255. The electrolyte layer 260 may transfer ions between the anode layer 245 and the cathode layer 255. The electrolyte layer 260 may transfer cations from the anode layer 245 to the cathode layer 255 during the operation of the battery cell 120. The electrolyte layer 260 may transfer cations (e.g., lithium ions) from the cathode layer 255 to the anode layer 245 during the operation of the battery cell 120.

FIG. 6B is an illustration of a prismatic battery cell 120. The prismatic battery cell 120 may have a housing 230 that defines a rigid enclosure. The housing 230 may have a polygonal base, such as a triangle, square, rectangle, pentagon, among others. For example, the housing 230 of the prismatic battery cell 120 may define a rectangular box. The prismatic battery cell 120 may include at least one anode layer 245, at least one cathode layer 255, and at least one electrolyte layer 260 disposed within the housing 230. The prismatic battery cell 120 may include a plurality of anode layers 245, cathode layers 255, and electrolyte layers 260. For example, the layers 245, 255, 260 may be stacked or in a form of a flattened spiral. The prismatic battery cell 120 may include an anode tab 265. The anode tab 265 may contact the anode layer 245 and facilitate energy transfer between the prismatic battery cell 120 and an external component. For example, the anode tab 265 may exit the housing 230 or electrically couple with a positive terminal 235 to transfer energy between the prismatic battery cell 120 and an external component.

The battery cell 120 may also include a pressure vent 270. The pressure vent 270 may be disposed in the housing 230. The pressure vent 270 may provide pressure relief to the battery cell 120 as pressure increases within the battery cell 120. For example, gases may build up within the housing 230 of the battery cell 120. The pressure vent 270 may provide a path for the gases to exit the housing 230 when the pressure within the battery cell 120 reaches a threshold.

The present invention, thus generally described, will be understood more readily by reference to the following examples, which are provided by way of illustration and are not intended to be limiting of the present invention.

EXAMPLES

General. First-principles density functional theory (DFT)-based methodologies may be used to determine, understand, and pre-select materials exhibiting the desired properties to modify the olivine-structured materials described herein. The DFT algorithms are used calculate the thermodynamic stability of the materials, to identify those material shaving stable ground state structures vs. high-energy structures. The DFT algorithms may be used to also determine the electrochemical properties such as average voltage ($\bar{V}$) between $x=x_1$ and $x_2$ (i.e., Li composition) in $Li_xMO_y$ and/or $Li_xMP_yO_z$ by using the Gibbs free energy ($\Delta G$) obtained from the internal DFT energy (E) calculations according to the following equation:

$$\bar{V} = -\frac{\Delta G}{(x_2 - x_1)ne} \approx -\frac{E_{Li_{x_2}MX} - E_{Li_{x_1}MX} - nE_{Li}}{(x_2 - x_1)ne}$$

Example 1. Cathode active material comprising a lithium metal phosphate (Li—M—P—O) other than LiFePO$_4$ and LiMnPO$_4$. Using DFT, a list of Li—M—P—O candidates were identified exhibiting an average voltage of about 3.4 V to about 4.0 V, versus the Li/Li$^+$, to identify the candidates that exhibit a potential between that of LFP and LMFP. Table 1 is a listing of potential candidates.

TABLE 1

Potential candidates for Li—M—P—O cathode active materials. Materials exhibiting higher oxidation states are marked as not preferred, due to potential reducing environments presented during heat treatment conditions when preparing LFP, LMP, and/or LFMP.

| Li—M—P—O Compounds | Voltage (vs. Li/Li$^+$) | Capacity [mAh/g] | Oxidation State | Materials Screening |
|---|---|---|---|---|
| Li$_{0.1}$FePO$_4$ | 3.4 | 170 | Fe$^{2+}$ | Reference (LFP) |
| LiV(PO$_4$)$_2$ | 3.4 | 102 | V$^{5+}$ | NP |
| Li$_{0.2}$CrP$_2$O$_7$ | 3.41 | 224 | Cr$^{2+}$ | P |
| LiSb(PO$_4$)$_2$ | 3.42 | 161 | Sb$^{5+}$ | NP |
| Li$_{1.5-3}$V$_2$(PO$_4$)$_3$ | 3.52 | 99 | V$^{4+}$ | P |
| LiCu(PO$_3$)$_3$ | 3.57 | 171 | Cu$^{2+}$ | P |
| Li$_{0.1}$VPO$_5$ | 3.66 | 159 | V$^{4+}$ | P |
| LiCu(PO$_4$)$_2$ | 3.76 | 186 | Cu$^{5+}$ | NP |
| LiV(PO$_4$)$_2$ | 3.76 | 105 | V$^{5+}$ | NP |
| Li$_{0.1}$VP$_2$O$_7$ | 3.87 | 116 | V$^{3+}$ | P |
| LiCr$_2$(PO$_4$)$_3$ | 3.89 | 257 | Cr$^{4+}$ | P |
| Li$_{1-2}$CoP$_2$O$_7$ | 3.9 | 109 | Co$^{2+}$ | P |

TABLE 1-continued

Potential candidates for Li—M—P—O cathode active materials. Materials exhibiting higher oxidation states are marked as not preferred, due to potential reducing environments presented during heat treatment conditions when preparing LFP, LMP, and/or LFMP.

| Li—M—P—O Compounds | Voltage (vs. Li/Li$^+$) | Capacity [mAh/g] | Oxidation State | Materials Screening |
|---|---|---|---|---|
| Li$_{0-2}$CuPO$_4$ | 3.9 | 311 | Cu$^{1+}$ | P |
| Li$_{0-1}$MnPO$_4$ | 3.91 | 171 | Mn$^{2+}$ | Reference (LMP) |

*Note:
P is "preferred," and NP is "not preferred."

Since LFP, LMP, and LMFP may be synthesized under the reducing environment, compounds with higher metal oxidation states from the Table 1 above are eliminated for further investigation. For example, V can have the oxidation states of V$^{2+}$, V$^{3+}$, V$^{4+}$, and V$^{5+}$. The metal oxidation state of V in LiV(PO$_4$)$_2$ is 5+. Therefore, it may decompose to binary (e.g., V—O, V—P), ternary (e.g., Li—V—O, Li—V—P, V—P—O), or quarterly (e.g., Li—V—P—O) compounds with lower metal oxidation states. With such rationales, Li$_{0-2}$CrP$_2$O$_7$, LiV$_2$(PO$_4$)$_3$, LiCu(PO$_3$)$_3$, Li$_{0-1}$VPO$_5$, Li$_{0-1}$VP$_2$O$_7$, LiCr$_2$(PO$_4$)$_3$, Li$_{1-2}$CoP$_2$O$_7$, and Li$_{0-2}$CuPO$_4$ from Table 1, identified as preferred, are proceeded for the further analysis.

Figure 7A:
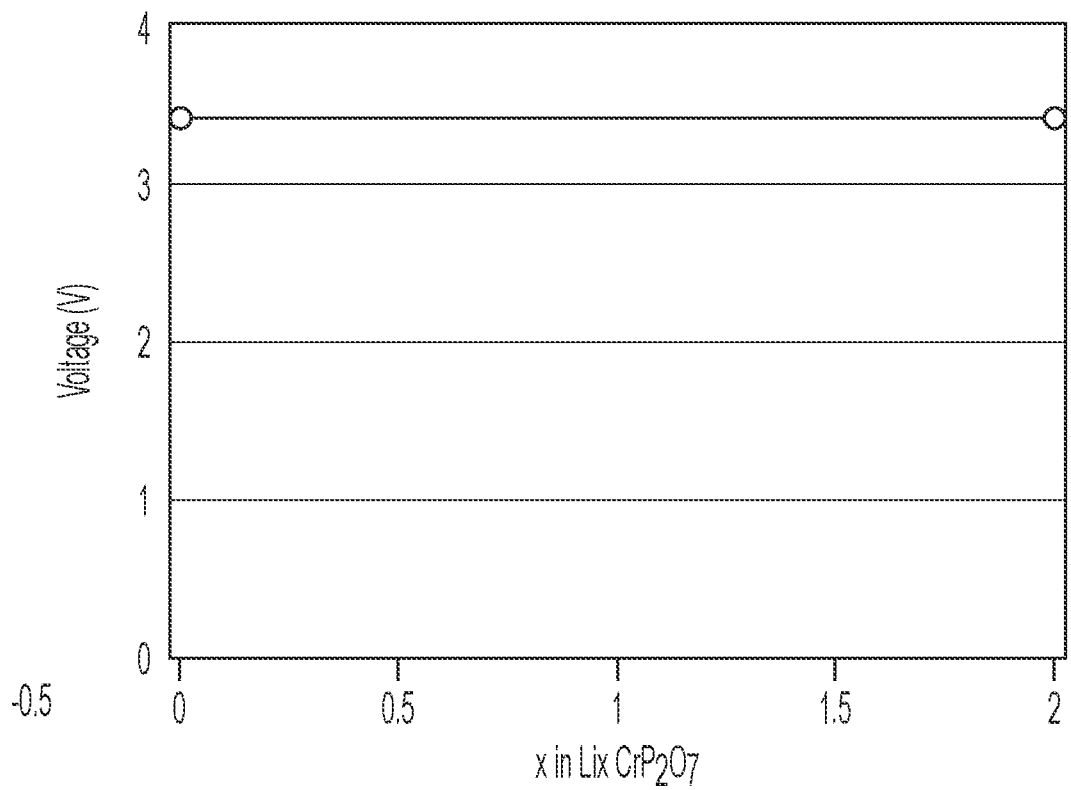
FIG. 7A is a graph of the discharge curve of $Li_{0-2}CrP_2O_7$, exhibiting a plateau at 3.41 V vs. $Li/Li^+$.
Figure 7B:
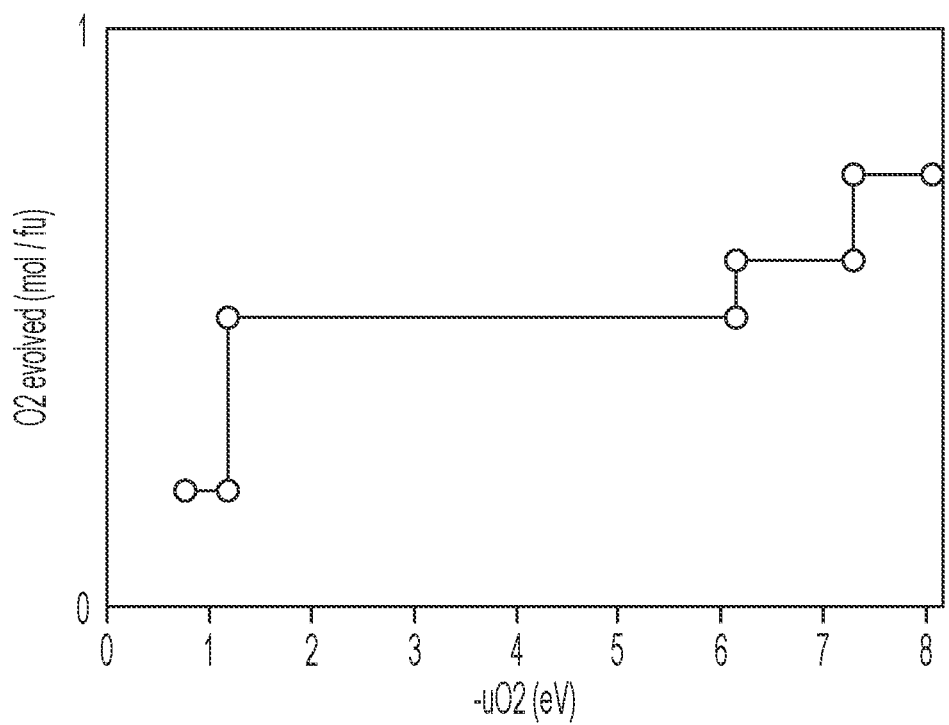
FIG. 7B is a graph of $O_2$ gas evolution tendency as function of oxygen chemical potentials, according to the examples.

FIG. 7A is a graph of the discharge curve of Li$_{0-2}$CrP$_2$O$_7$, exhibiting a plateau at 3.41 V vs. Li/Li$^+$. FIG. 7B is a graph of O$_2$ gas evolution tendency as function of oxygen chemical potentials. These oxygen chemical potentials may be converted to temperatures according to the following equation:

$$\Delta\mu_O(T-T_0) = \Delta H_O^{exp}(T-T_0) - T\Delta S_O^{exp}(T-T_0) + RT \ln(p_{O_2}/p_{tot})$$

In the above equation, changes in the enthalpy and entropy with temperature can be obtained from the experimental thermochemical tables, and partial pressure of oxygen gas at room temperature and pressure, $p_{O2}=0.21\ p_{tot}$. These oxygen chemical potentials can be converted to more accessible temperature scales.

Figure 8A:
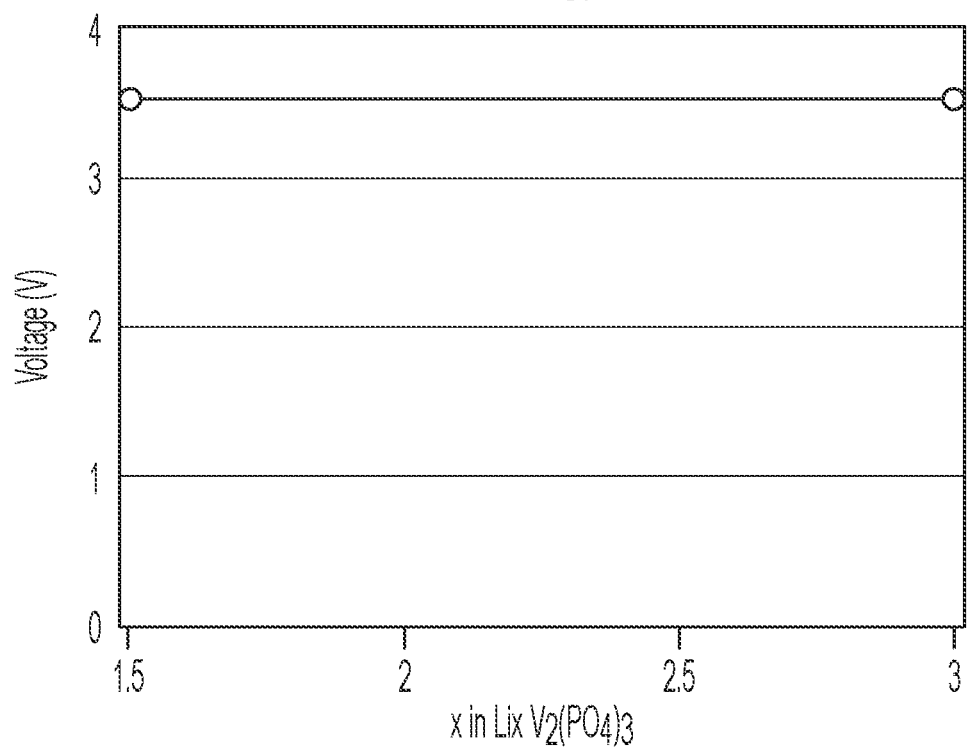
FIG. 8A is a graph of the discharge curve for $Li_{1.5-3}V_2(PO_4)_3$, exhibiting a plateau at about 3.52 V vs. $Li/Li^+$.
Figure 8B:
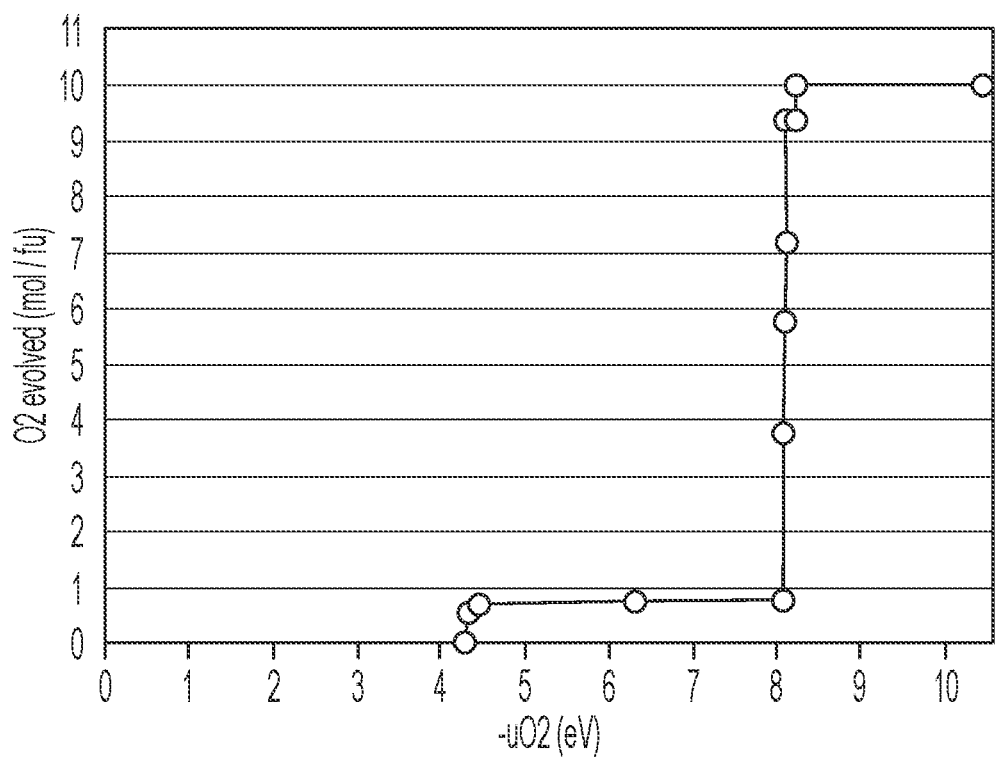
FIG. 8B is a graph of $O_2$ evolution tendencies for $Li_{1.5-3}V_2(PO_4)_3$, according to the examples.

FIGS. 8A and 8B are the voltage curves and O$_2$ evolution tendencies for Li$_{1.5-3}$V$_2$(PO$_4$)$_3$. It shows the plateau at 3.52 V vs. Li/Li$^+$, and within the voltage window range between LFP and LMP.

Figure 9A:
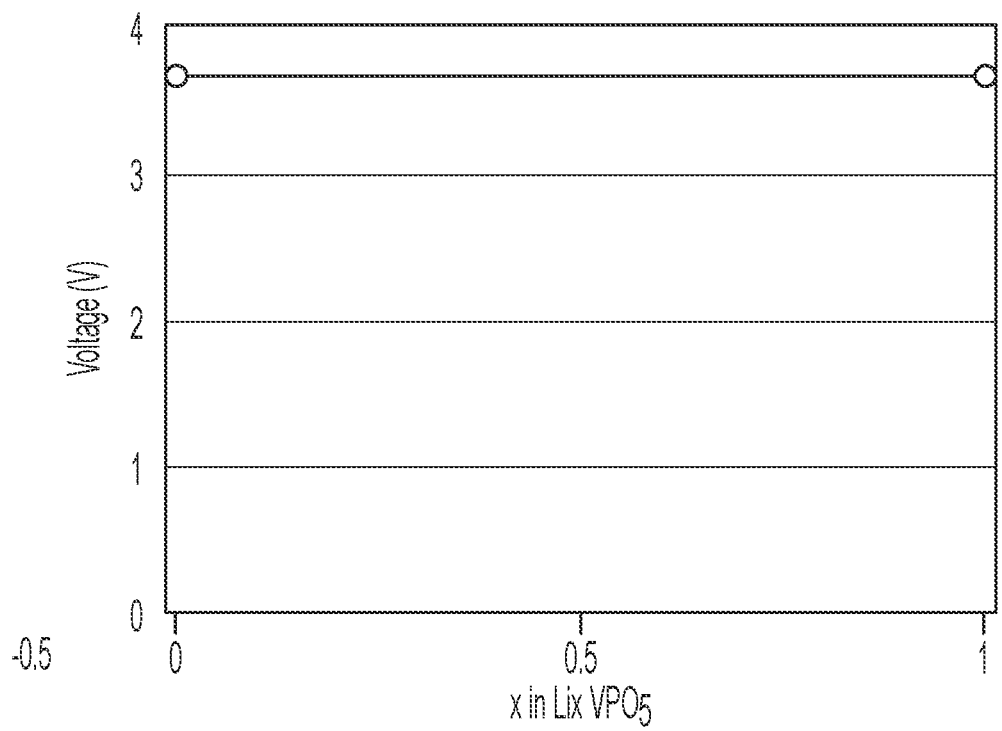
FIG. 9A is a graph of the discharge curve for $Li_{0-1}VPO_5$, exhibiting a plateau at about 3.66 V vs. $Li/Li^+$.
Figure 9B:
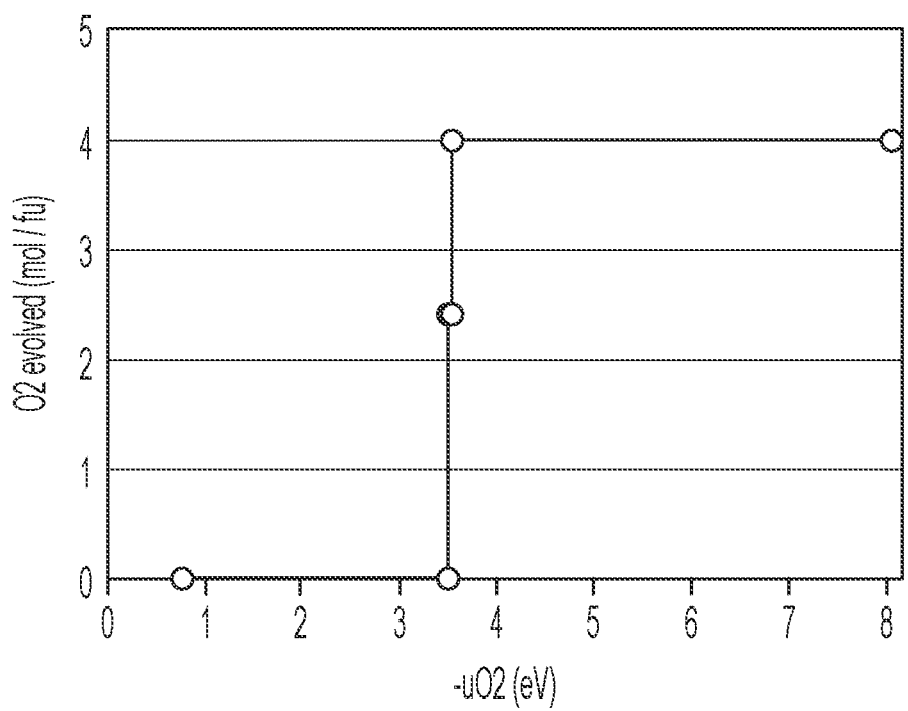
FIG. 9B is a graph of $O_2$ evolution tendencies for $Li_{0-1}VPO_5$, according to the examples.

FIGS. 9A and 9B are graphs of the voltage curves and O$_2$ evolution tendencies for Li$_{0-1}$VPO$_5$. They show the plateau at 3.66 V vs. Li/Li$^+$, within the voltage window range between LFP and LMP.

Figure 10A:
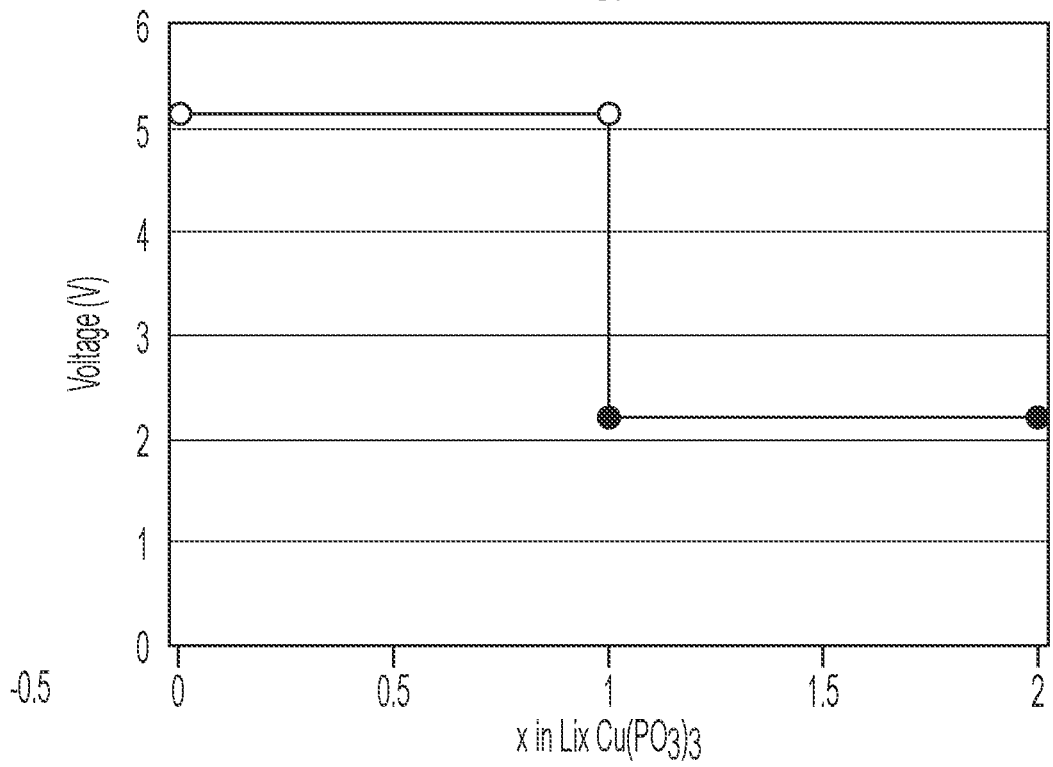
FIG. 10A is a graph of the discharge curve for $LiCu(PO_3)_3$, exhibiting an average voltage of about 3.57 V vs. $Li/Li^+$, two different plateaus are observed between about 2 V and 5 V vs. $Li/Li^+$.
Figure 10B:
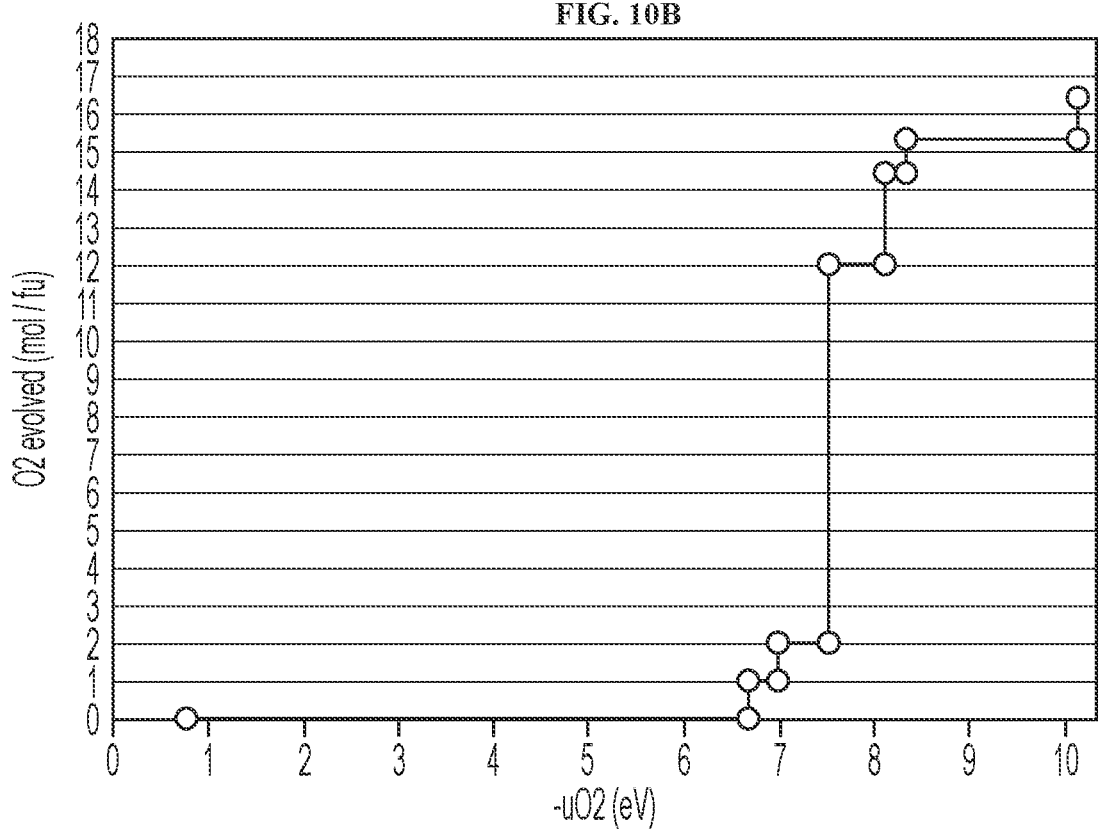
FIG. 10B is a graph of $O_2$ evolution tendencies for $LiCu(PO_3)_3$, according to the examples.

FIGS. 10A and 10B are graphs of the voltage curves and O$_2$ evolution tendencies of LiCu(PO$_3$)$_3$. Although average voltage is 3.57 V, LiCu(PO$_3$)$_3$ have two different plateaus outside of the target voltage window of about 3.4 to about 4 V vs. Li/Li$^+$. Accordingly, LiCu(PO$_3$)$_3$ does not satisfy the voltage specification.

Figure 11A:
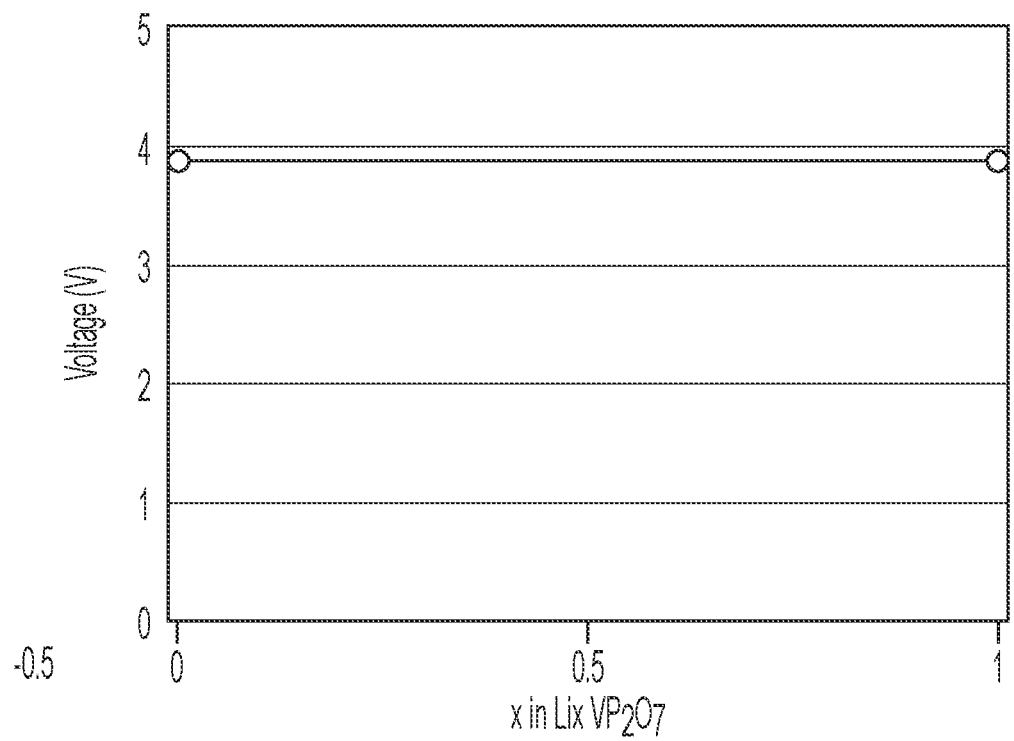
FIG. 11A is a graph of the discharge curve for $Li_{0-1}VP_2O_7$, exhibiting a plateau at about 3.87 V vs. $Li/Li^+$.
Figure 11B:
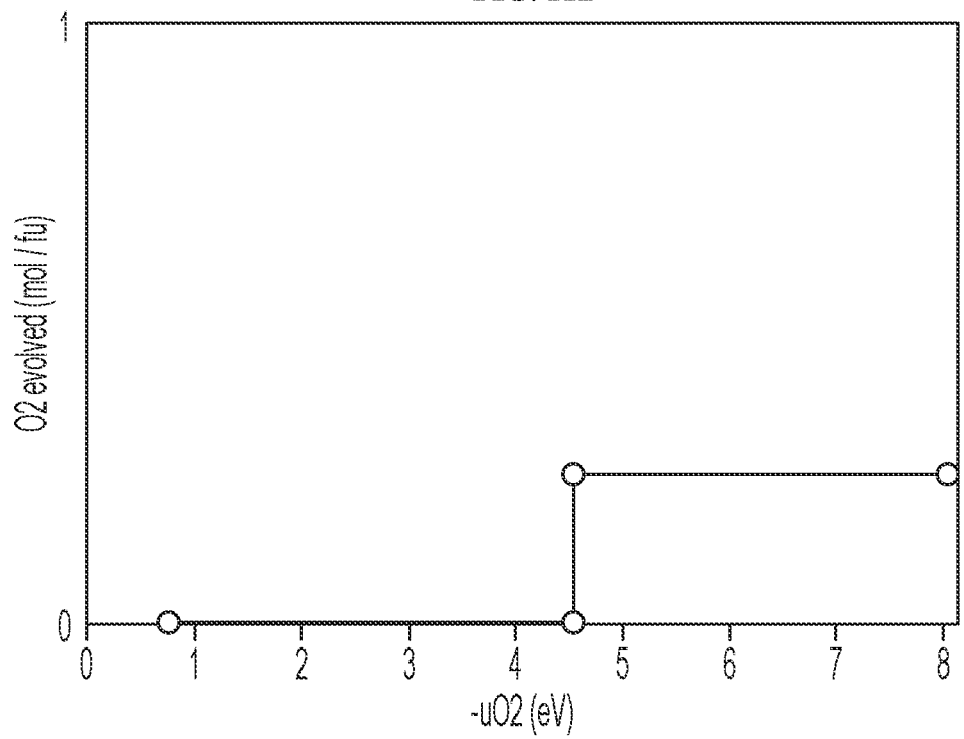
FIG. 11B is a graph of $O_2$ evolution tendencies for $Li_{0-1}VP_2O_7$, according to the examples.

FIGS. 11A and 11B are graphs of the voltage curves and O$_2$ gas evolution tendencies of Li$_{0-1}$VP$_2$O$_7$. Li$_{0-1}$VP$_2$O$_7$, illustrating a plateau at 3.87 V vs. Li/Li$^+$, and within the voltage window range between LFP and LMP.

Figure 12A:
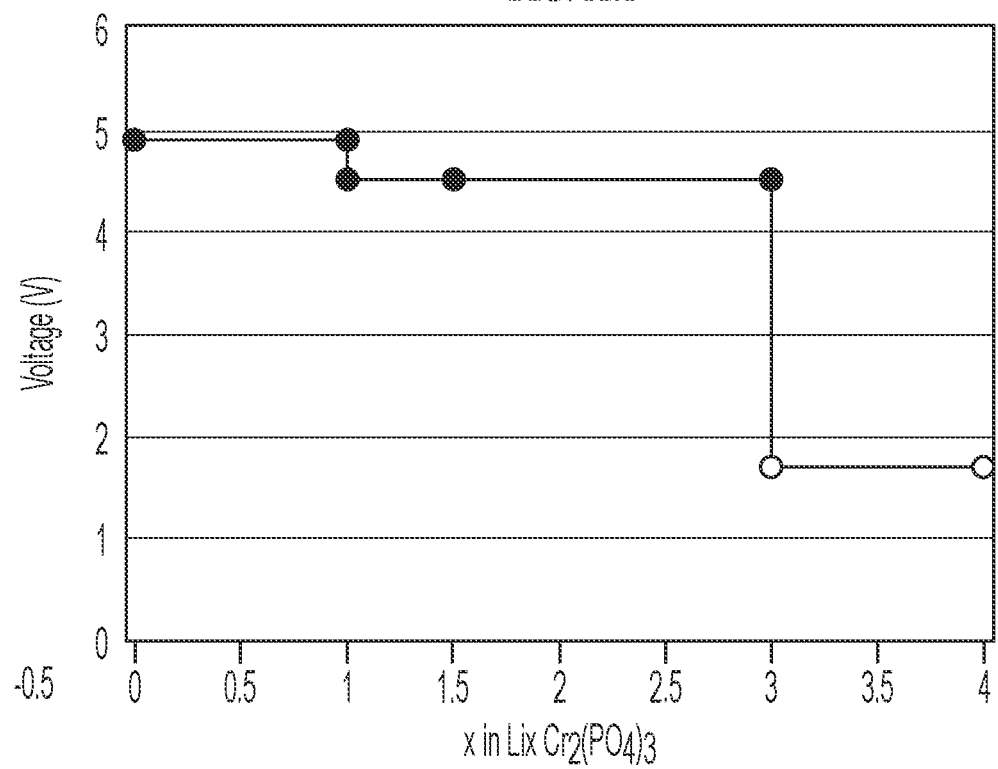
FIG. 12A is a graph of the discharge curve for $LiCr_2(PO_4)_3$, exhibiting an average voltage of about 3.89 V vs. $Li/Li^+$, four different plateaus are observed between about 1 V and 5 V vs. $Li/Li^+$.
Figure 12B:
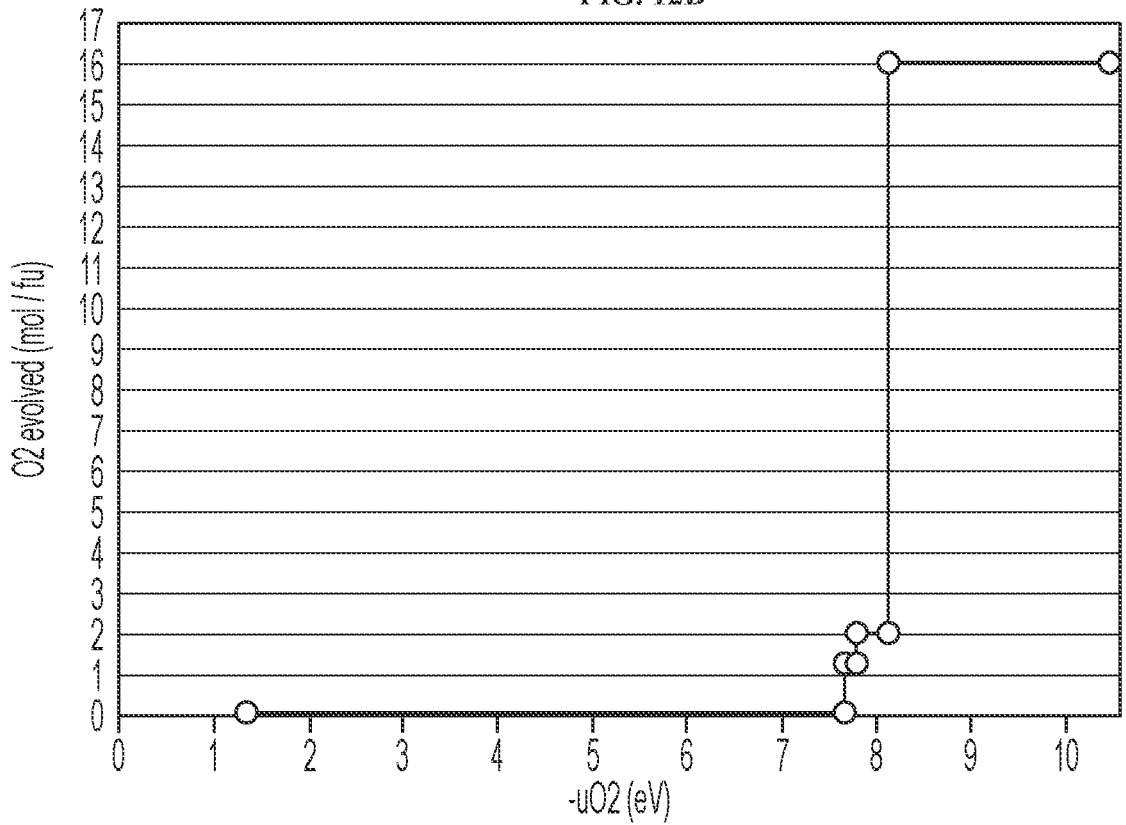
FIG. 12B is a graph of $O_2$ evolution tendencies for $LiCr_2(PO_4)_3$, according to the examples.

FIGS. 12A and 12B are the voltage curves and O$_2$ evolution tendencies of LiCr$_2$(PO$_4$)$_3$. Although average voltage is 3.89 V, LiCu(PO$_3$)$_3$ exhibits four different plateaus outside of the target voltage window of about 3.4 to about 4 V vs. Li/Li$^+$. Accordingly, LiCr$_2$(PO$_4$)$_3$ does not satisfy the voltage specification.

Figure 13A:
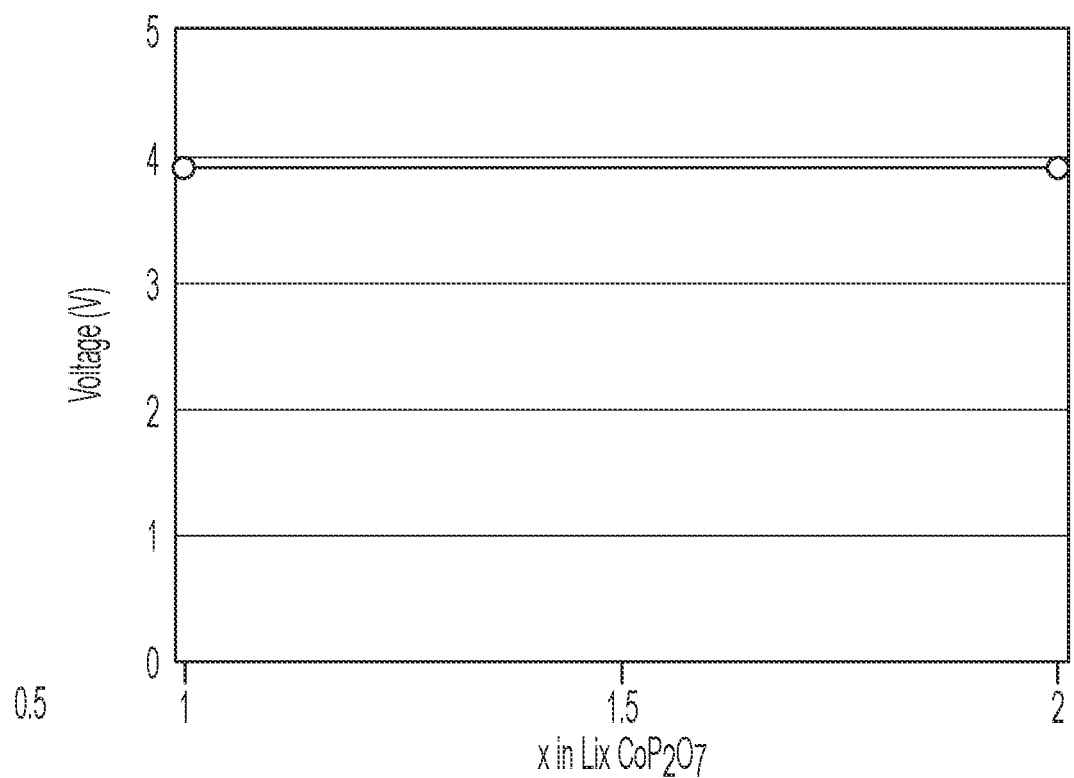
FIG. 13A is a graph of the discharge curve for $Li_{1-2}CoP_2O_7$, exhibiting a plateau at about 3.9 V vs. $Li/Li^+$.
Figure 13B:
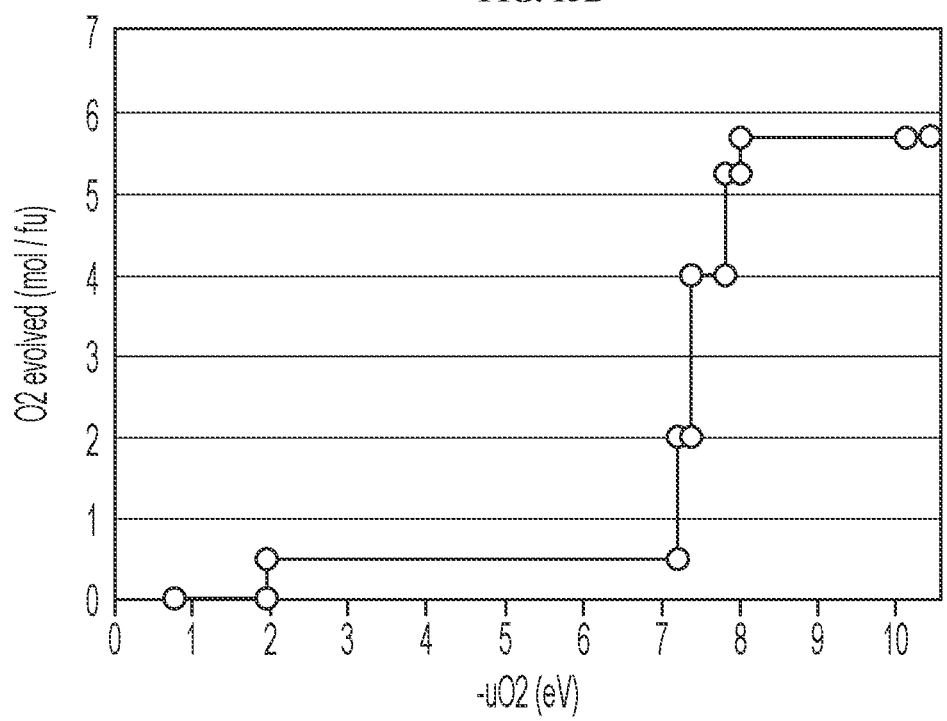
FIG. 13B is a graph of $O_2$ evolution tendencies for $Li_{1-2}CoP_2O_7$, according to the examples.

FIGS. 13A and 13B are the voltage curves and O$_2$ evolution tendencies of Li$_{1-2}$CoP$_2$O$_7$. Li$_{1-2}$CoP$_2$O$_7$ exhibits a plateau at 3.9 V vs. Li/Li$^+$, within the voltage window range between LFP and LMP.

Figure 14A:
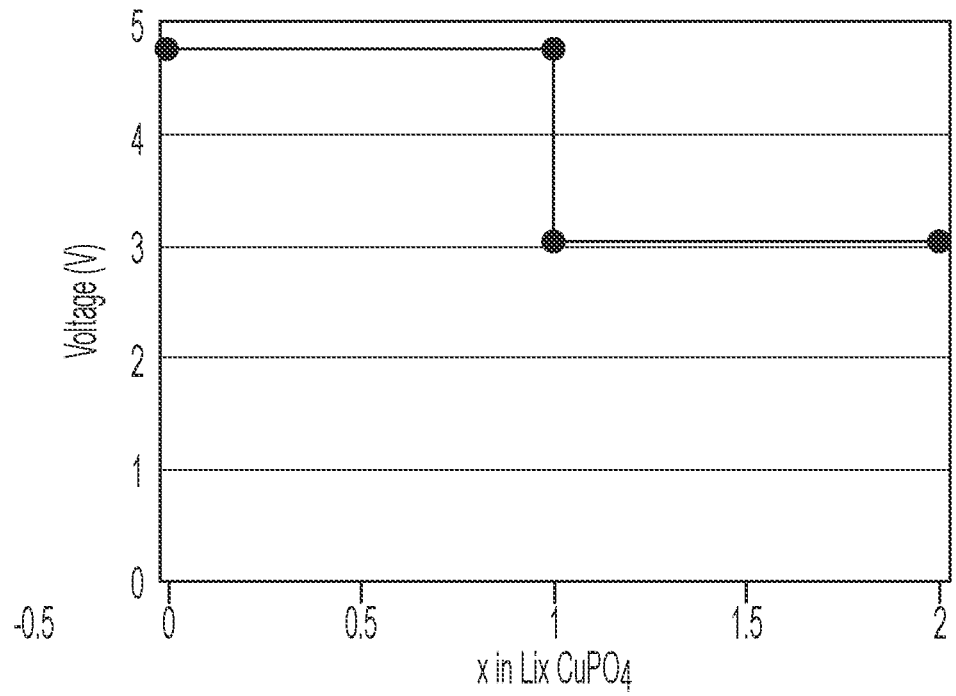
FIG. 14A is a graph of the discharge curve for $Li_{0-2}CuPO_4$, exhibiting an average voltage of about 3.9 V vs. $Li/Li^+$, two different plateaus are observed between about 3 V and 5 V vs. $Li/Li^+$.
Figure 14B:
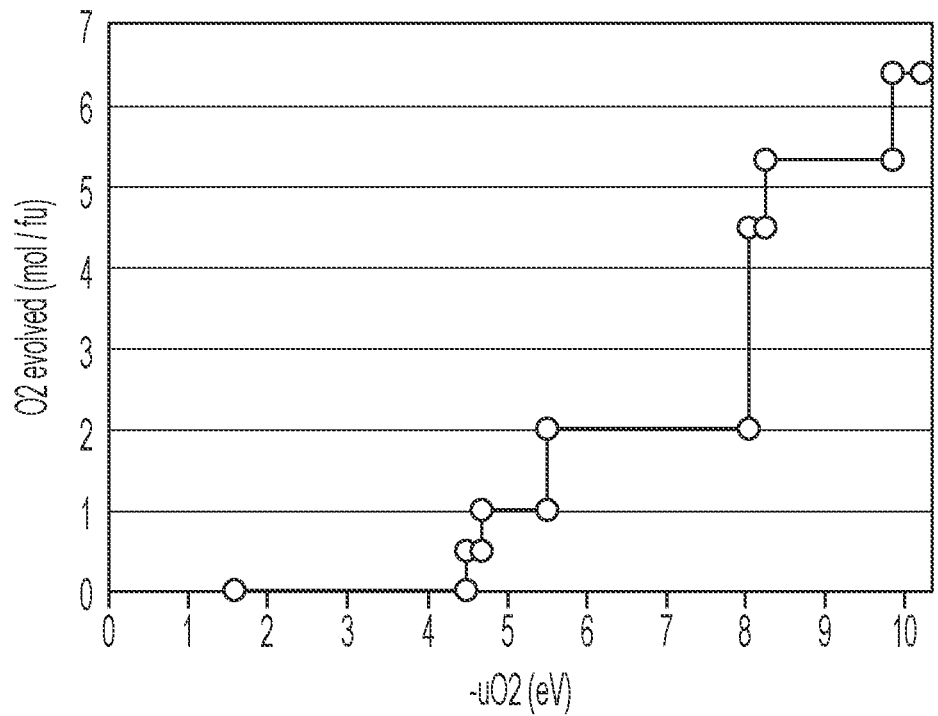
FIG. 14B is a graph of $O_2$ evolution tendencies for $Li_{0-2}CuPO_4$, according to the examples.

FIGS. 14A and 14B show the voltage curves and O$_2$ evolution tendencies of Li$_{0-2}$CuPO$_4$. Although average voltage is 3.9 V, Li$_{0-2}$CuPO$_4$ exhibits two different plateaus outside of the target voltage window of about 3.4 to about 4 V vs. Li/Li$^+$. Accordingly, Li$_{0-2}$CuPO$_4$ does not satisfy the voltage specification.

To summarize the results of FIGS. 7-14, LiCu(PO$_3$)$_3$, Li$_x$Cr$_2$(PO$_4$)$_3$, and Li$_{0-2}$CuPO$_4$ exhibit two or more voltage plateaus, outside of LFP and LMP windows. Table 2 lists the illustrative Li—M—P—O candidate materials.

TABLE 2

Illustrative Li—M—P—O candidate materials.

| Li—M—P—O Compounds | Voltage (vs. Li/Li$^+$) | Capacity [mAh/g] | Voltage screening | O$_2$ evolution |
|---|---|---|---|---|
| Li$_{0-2}$CrP$_2$O$_7$ | 3.41 | 224 | Passed | Worse than MnPO$_4$ |
| Li$_{1.5-3}$V$_2$(PO$_4$)$_3$ | 3.52 | 99 | Passed | Comparable to FePO$_4$ |
| Li$_{0-1}$VPO$_5$ | 3.66 | 159 | Passed | Comparable to FePO$_4$ |
| Li$_{0-1}$VP$_2$O$_7$ | 3.87 | 116 | Passed | Comparable to FePO$_4$ |
| Li$_{1-2}$CoP$_2$O$_7$ | 3.9 | 109 | Passed | Worse than MnPO$_4$ |

Figure 15:
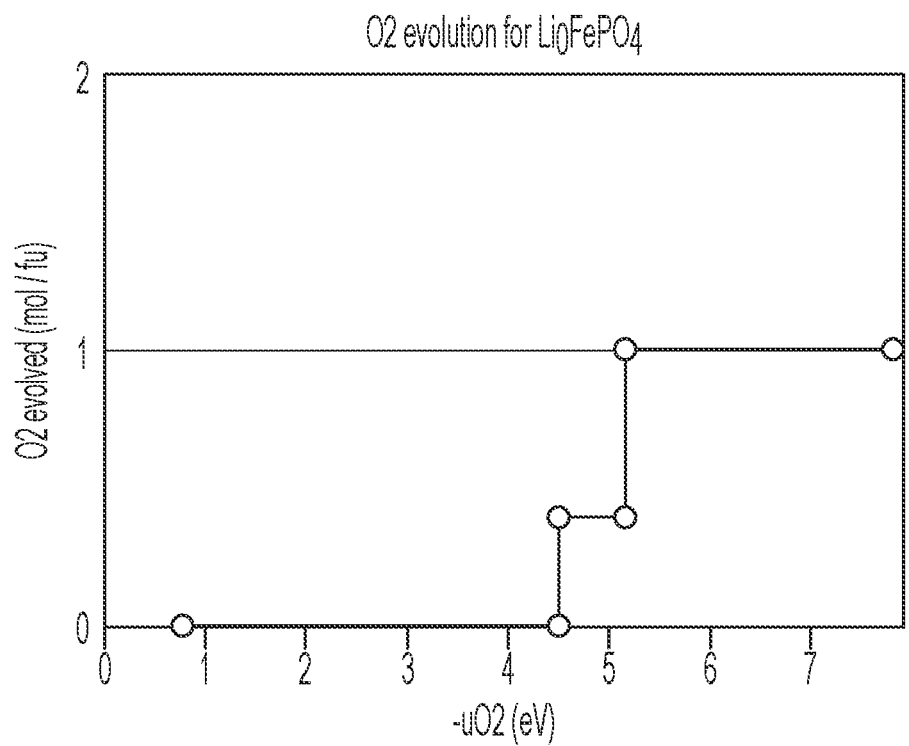
FIG. 15 is a graph of the $O_2$ evolution tendency for $FePO_4$, according to the examples.
Figure 16:
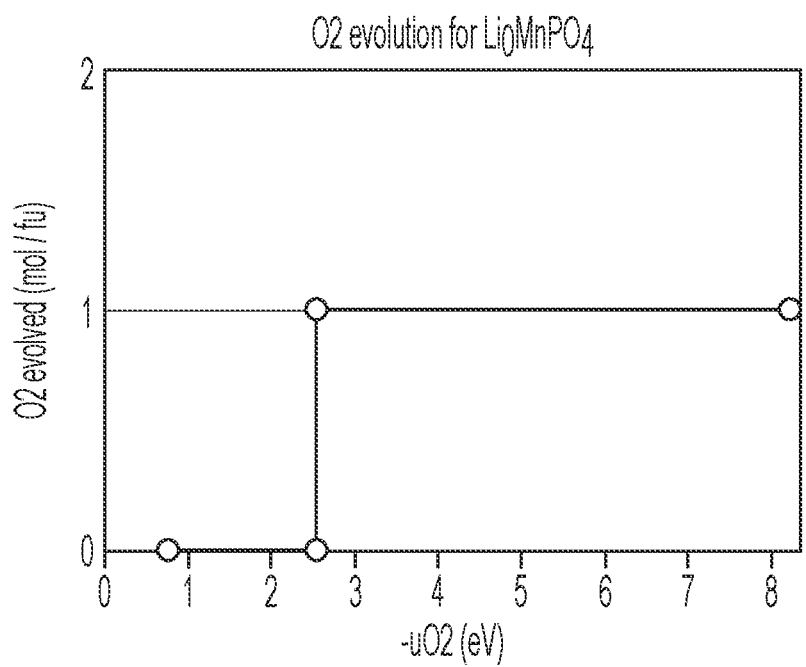
FIG. 16 is a graph of the $O_2$ evolution tendency for $MnPO_4$, according to the examples.

FIGS. 15 and 16 are graphs of oxygen evolution tendency for FePO$_4$ and MnPO$_4$. Oxygen evolution reactions initiate at about 4.4 eV $\mu_{O2}$ and 2.6 eV $\mu_{O2}$ for FePO$_4$ and MnPO$_4$, respectively. These values correspond to approximately 600° C. and 330° C., respectively. In practice, the charged LMP (i.e., MnPO$_4$) in the battery cell may exhibit thermal runway starting at about 220° C. to 270° C.

It has been found that for CrP$_2$O$_7$, oxygen gas evolution initiates at lower temperatures (see FIG. 7B compared to the MnPO$_4$ in FIG. 16. The V$_2$(PO$_4$)$_3$ in FIG. 8B has comparable oxygen evolution with LFP in FIG. 15. The VPO$_5$ in FIG. 9B exhibits less oxygen evolution compared to LMP, but is slightly less stable than LFP. The VP$_2$O$_7$ in FIG. 11B exhibits comparable oxygen evolution with LFP in FIG. 15, while the Li$_1$CoP$_2$O$_7$ in FIG. 13B exhibits poorer performance than MnPO$_4$. Accordingly, materials such as Li$_{1.5-3}$V$_2$(PO$_4$)$_3$, Li$_{0-1}$VPO$_5$, and Li$_{0-1}$VP$_2$O$_7$ may exhibit desired properties with respect to both voltage increase and oxygen evolution resistance.

Example 2. Cathode Active Materials Comprising a Lithium Manganese (Mn) Iron (Fe) Phosphate The metal ordering between Mn and Fe may affect the Li mobility and diffusion, affecting the voltage. For example, in the case of LiNi$_{0.5}$Mn$_{1.5}$O$_4$ cathode materials, the crystal growth can be affected by the growing condition and reaction temperature. The cubic spinel (Fd-3m) has the disordered mixing between Ni and Mn. In the case of ordered Ni and Mn metal mixing, the crystal structure is P4$_1$32. Because their structure difference, the disordered cubic spinel has a predominant one step reaction at 4.65 V v. Li/Li$^+$, while ordered structure (P4$_1$32) has a sloping curve to a flat curve at 4.72 V v. Li/Li$^+$.

There are two different metal mixing scenarios in LiMPO$_4$ cathode between Mn and Fe. In disordered mixing of Mn and Fe in LiMPO$_4$ cathodes, Mn and Fe are randomly located within the structure. In ordered mixing of Mn and Fe in LiMPO$_4$ cathodes, there is segregation between LMP- and LFP-like regions. As mentioned above, the voltage of LMFP, depending on the atomic arrangement of transition metals, may be tuned by changing it to ordered or disordered sublattice.

Figure 17:
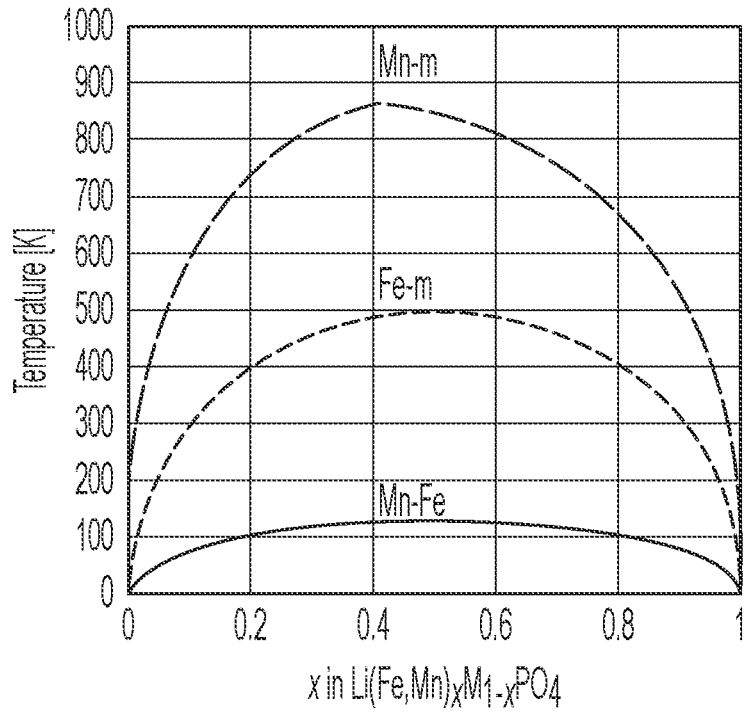
FIG. 17 shows the two-phase mixing diagram between two $LiMPO_4$ structures with the black line showing the mixing between LFP and LMP, and the y-axis showing the temperature in Kelvin.

As shown in FIG. 17, at room temperature, Mn and Fe mixing will be above the miscibility gap, meaning that the structure will have a crystal structure of disordered solid solution mixing between Mn and Fe. Introducing another element M, may be able to affect the mixing tendency. For example, element such as Ni will mix more strongly with Fe than Mn. Another element may increase or decrease the miscibility gap.

Figure 18:
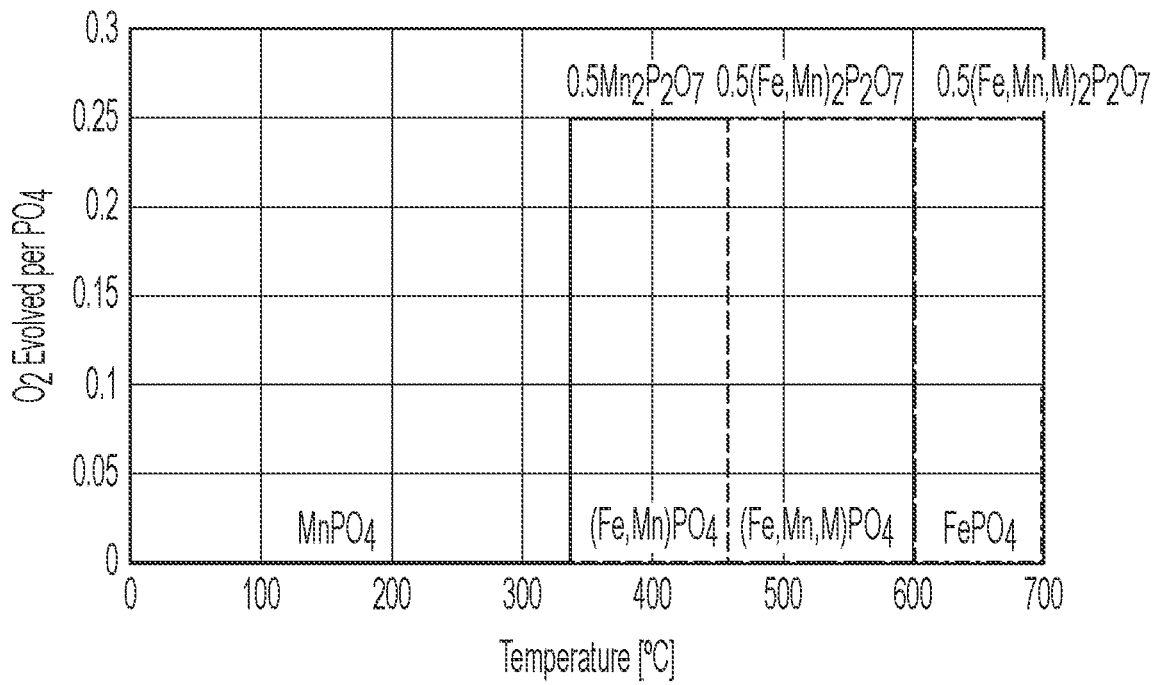
FIG. 18 shows the gas evolution as function of temperature for different chemistry.

It has been found that Li—V—P—O compounds are beneficial in both increasing the voltage and preventing the oxygen gas evolution from the charged compounds. As shown in FIG. 18 and discussed above, $MnPO_4$ has reduced $O_2$ stability compared to $FePO_4$. In the case of Fe and Mn mixed Olivine structure, the $O_2$ evolution may be prevented until at a higher temperature (i.e., moving closed to that of LFP, and further from LMP; FIG. 18). If another element such as V was added, the thermal runaway temperature may be further increased, as shown in FIG. 18.

Figure 19:
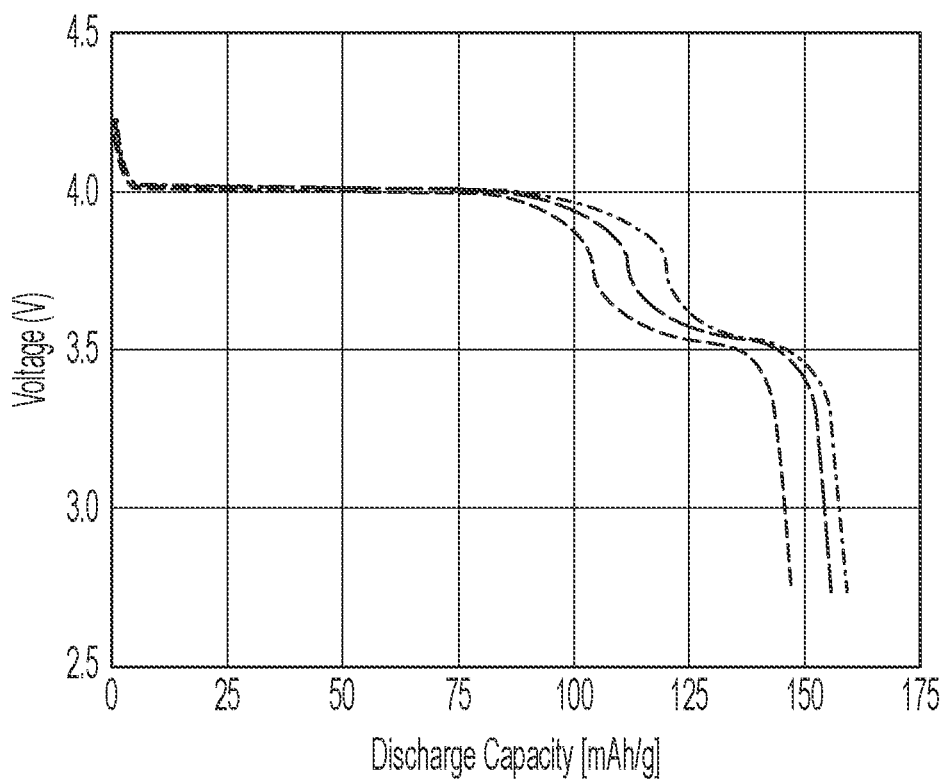
FIG. 19 shows the examples of voltage vs. capacity curve of LMFP based cathode materials during the discharge cycle, where the 4 V plateau indicates two phase transitions between $LiMnPO_4$ and $MnPO_4$, and the 3.5 V plateau indicating two phase transitions between $LiFePO_4$ and $FePO_4$.

As shown in FIG. 19, tuning the Fe—Mn metal mixing and introducing a new element may help increase the transition plateaus located between 3.5 to 4 V that can increase the energy density of battery cell. The discharge curve represents slower C-rate such as C/50, C/20, C/10, etc. as compared to pure LFP cathode, and the second plateau typically locates slightly higher (0.05 to 0.1 V higher). The exact voltage curves may depend on the redox voltage when a third element/material is enclosed (i.e., between 3.4 to 4 V vs. $Li/Li^+$). Between the two plateaus, there is a voltage drop between LMP-like toward LFP-like region. Inducing different Fe—Mn metal orderings by various methods including but are not limited to temperature fluctuation, precursor selection may affect the "middle" region. The higher the voltage of the LMFP (i.e., closer to 4 V) in the discharge curve, the greater the energy density (i.e., capacity times voltage) of the LMFP.

A Li—V—P—O compound that may be added to the LMFP to increase the voltage and prevent the oxygen gas evolution may be selected from those identified in Table 2, including but are not limited to $Li_3V_2(PO_4)_3$, $LiVPO_5$, and $LiVP_2O_7$. Including Li—V—P—O compounds with a voltage plateau between 3.52, 3.66, and 3.87 V, located between LFP and LMP will be helpful to increase the overall energy density of the LMFP based chemistry.

Figure 20:
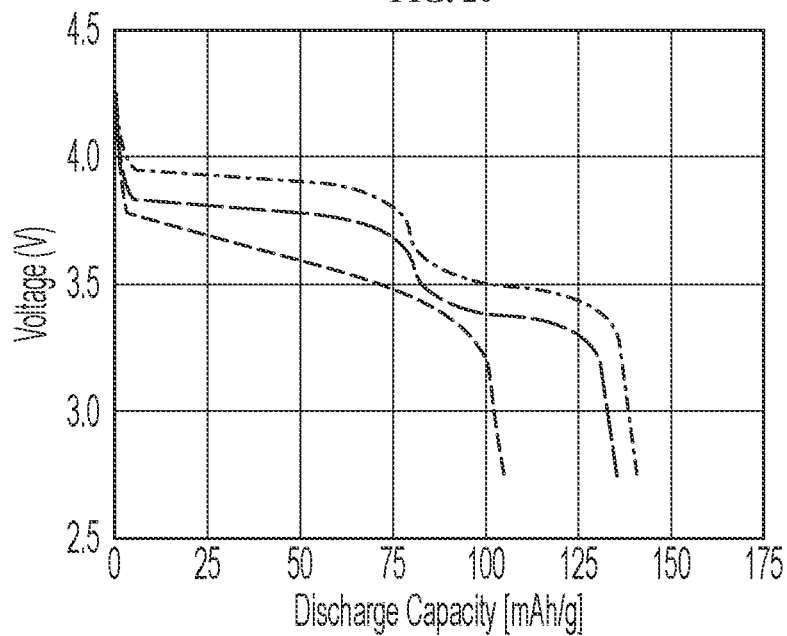
FIG. 20 shows the higher rate (above 1 C) discharge curve for the pristine LMFP (orange) and modified LMFP cathodes (blue and green curves).

As shown in FIG. 20, by incorporating higher voltage materials and/or inducing Fe—Mn ordering, the overall voltage curve may locate at higher voltage regions, enabling increased energy density of the Li-ion battery materials, especially at higher C-rates.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, or compositions that can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. A cathode active material comprising a lithium manganese (Mn) iron (Fe) phosphate and further comprising a lithium metal phosphate that is $Li_{0-2}CrP_2O_7$, $LiVPO_5$, $Li_{0-1}VP_2O_7$, $Li_{1-2}CoP_2O_7$, or a combination of any two or more thereof, the lithium metal phosphate exhibiting a voltage that is greater than or equal to that of $LiFePO_4$ and less than or equal to that of $LiMnPO_4$ and an oxygen evolution that is less than or equal to $LiFePO_4$, wherein the lithium manganese iron phosphate has a mol ratio of Mn:Fe is from about 3:7 to about 9:1, the lithium manganese iron phosphate is an olivine structure, and the Mn and Fe in the olivine structure are present in an partially ordered sublattice or partially disordered sublattice.

2. The cathode active material of claim 1, wherein the lithium metal phosphate comprises $Li_{0-2}CrP_2O_7$, $Li_{1-2}CoP_2O_7$, or a combination thereof.

3. The cathode active material of claim 1, wherein the lithium metal phosphate comprises $LiVPO_5$, $Li_{0-1}VP_2O_7$, or a combination thereof.

4. The cathode active material of claim 1 further comprising a lithium metal oxide of formula $LiM'O_2$, wherein M' is Ni, Co, Mn, Al, Fe, or Cu.

5. The cathode active material of claim 1, wherein the partially ordered or partially disordered sublattice comprises a mixture of partial ordering within the lattice.

6. The cathode active material of claim 1, wherein the partially ordered or partially disordered sublattice comprises a partially disordered solid solution.

7. The cathode active material of claim 1, wherein the partially ordered or partially disordered sublattice comprises weak phase separation at the atomic scale.

8. The cathode active material of claim 1, wherein the lithium metal phosphate comprises $LiVPO_5$.

9. An electrochemical cell comprising a cathode comprising the cathode active material of claim 1.

10. The electrochemical cell of claim 9, wherein the cathode active material comprises $Li_{0-2}CrP_2O_7$, $Li_{1-2}CoP_2O_7$, or a combination thereof.

11. The electrochemical cell of claim 9, wherein the cathode active material comprises $LiVPO_5$, $Li_{0-1}VP_2O_7$, or a combination thereof.

12. The electrochemical cell of claim 9, wherein the cathode active material comprises $LiVPO_5$.

13. A cathode active material comprising a lithium metal phosphate blended with $LiFePO_4$, $LiMnPO_4$, or a mixture thereof, the lithium metal phosphate comprising $Li_{0-2}CrP_2O_7$, $LiVPO_5$, $Li_{1-2}CoP_2O_7$, or a combination of any two or more thereof, and exhibiting a voltage that is greater than or equal to that of $LiFePO_4$ and less than or equal to that of $LiMnPO_4$ and an oxygen evolution that is less than or equal to $LiFePO_4$.

14. The cathode active material of claim 13, wherein the lithium metal phosphate comprises $Li_{0-2}CrP_2O_7$, $Li_{1-2}CoP_2O_7$, or a combination thereof.

15. The cathode active material of claim 13, wherein the lithium metal phosphate comprises $LiVPO_5$, or a combination thereof.

16. The cathode active material of claim 13, wherein the lithium metal phosphate comprises $LiVPO_5$.

17. An electrochemical cell comprising a cathode comprising the cathode active material of claim 13.

18. The electrochemical cell of claim 17, wherein the lithium metal phosphate comprises $Li_{0-2}CrP_2O_7$, $Li_{1-2}CoP_2O_7$, or a combination thereof.

19. The electrochemical cell of claim 17, wherein the lithium metal phosphate comprises $LiVPO_5$, or a combination thereof.

20. The electrochemical cell of claim 17, wherein the lithium metal phosphate comprises $LiVPO_5$.

* * * * *